US008873114B2

(12) United States Patent
Miyajima

(10) Patent No.: US 8,873,114 B2
(45) Date of Patent: Oct. 28, 2014

(54) LENS ARRAY, IMAGING APPARATUS, AND IMAGE READING APPARATUS

(71) Applicant: Canon Kabushiki Kaisha, Tokyo (JP)

(72) Inventor: Yu Miyajima, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/139,652

(22) Filed: Dec. 23, 2013

(65) Prior Publication Data

US 2014/0185109 A1 Jul. 3, 2014

(30) Foreign Application Priority Data

Dec. 27, 2012 (JP) ................................ 2012-284438

(51) Int. Cl.
  H04N 1/04 (2006.01)
  H04N 1/46 (2006.01)
  G02B 5/32 (2006.01)
  H01L 31/00 (2006.01)
  B41J 2/435 (2006.01)
  G02B 3/00 (2006.01)

(52) U.S. Cl.
  CPC .................................... G02B 3/0037 (2013.01)
  USPC ........... 358/484; 358/473; 358/474; 358/475; 358/513; 359/19; 327/514; 347/229

(58) Field of Classification Search
  USPC ............ 358/484, 473, 474, 475, 513; 359/19; 327/514; 347/229
  See application file for complete search history.

(56) References Cited

U.S. PATENT DOCUMENTS

| 5,812,012 | A | * | 9/1998 | Jebens | 327/514 |
| 6,160,641 | A | * | 12/2000 | Kaneko et al. | 358/484 |
| 2001/0028484 | A1 | * | 10/2001 | Sasaki et al. | 359/19 |
| 2006/0176361 | A1 | * | 8/2006 | Seto | 347/229 |
| 2014/0029072 | A1 | * | 1/2014 | Onishi et al. | 358/513 |

FOREIGN PATENT DOCUMENTS

| JP | 11-258545 | A | 9/1999 |
| JP | 2002-318348 | A | 10/2002 |
| JP | 2005-122041 | A | 5/2005 |
| JP | 4495942 | B2 | 7/2010 |
| JP | 2010-170149 | A | 8/2010 |
| JP | 2011-095769 | A | 5/2011 |
| JP | 2012-16366 | A | 1/2012 |
| JP | 2012-163742 | A | 8/2012 |
| JP | 2012-247565 | A | 12/2012 |
| JP | 5216109 | B2 | 6/2013 |

* cited by examiner

*Primary Examiner* — Charlotte M Baker
*Assistant Examiner* — Rury Grisham
(74) *Attorney, Agent, or Firm* — Canon U.S.A., Inc. IP Division

(57) ABSTRACT

A lens array including: a plurality of imaging portions arrayed in a first direction; wherein each of the plurality of imaging portions includes a first optical system configured to form an intermediate image of an object and a second optical system configured to re-form the intermediate image of the object in a first cross section parallel to the first direction and a direction of optical axes of the imaging portions, and wherein in each of the plurality of imaging portions, an optical flux from an object height at which a light available efficiency becomes 90% is restricted by at least one of a first aperture surface of the first optical system and a second aperture surface of the second optical system, and the optical flux from an object height at which the light available efficiency becomes 10% is restricted by the aperture surface which restricts the optical flux from the object height at which the light available efficiency becomes 90%.

17 Claims, 27 Drawing Sheets

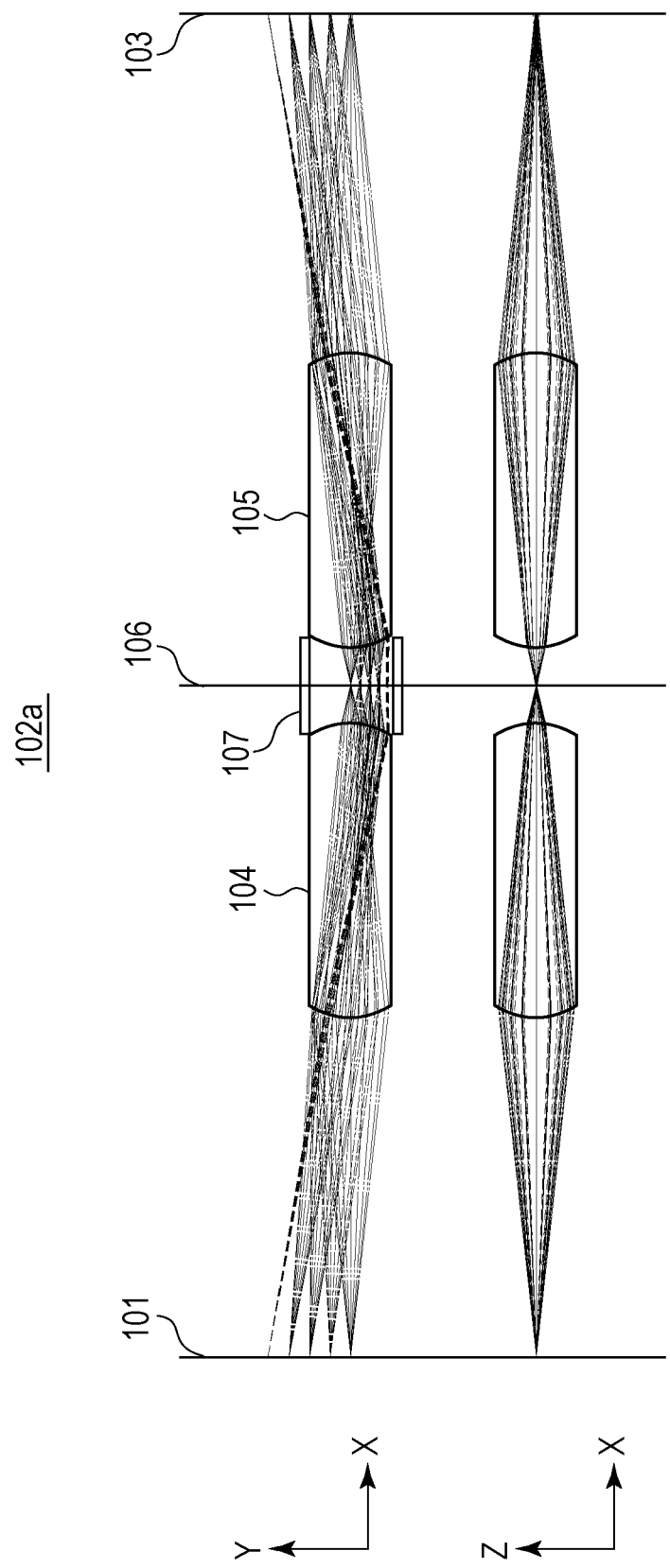

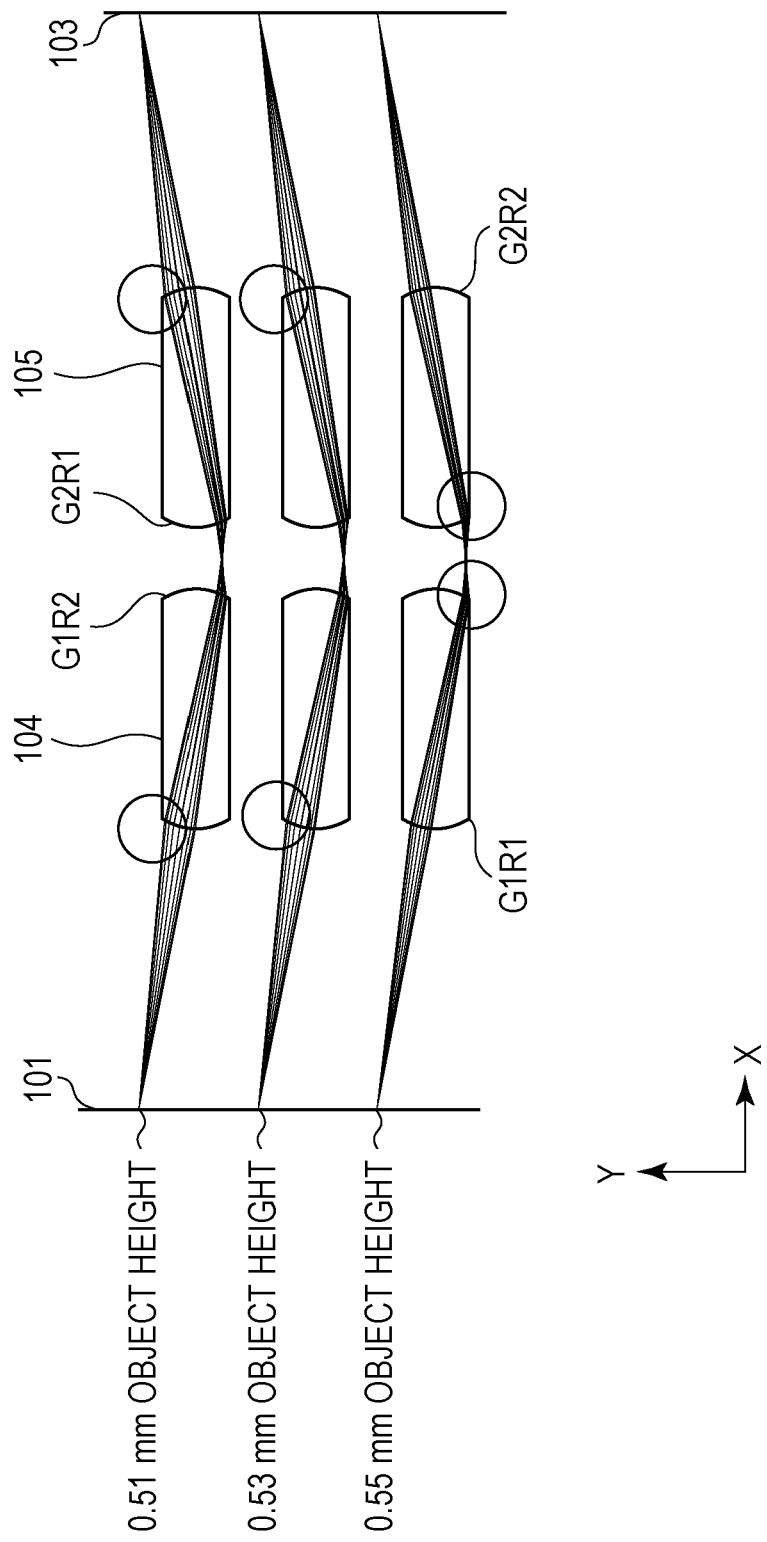

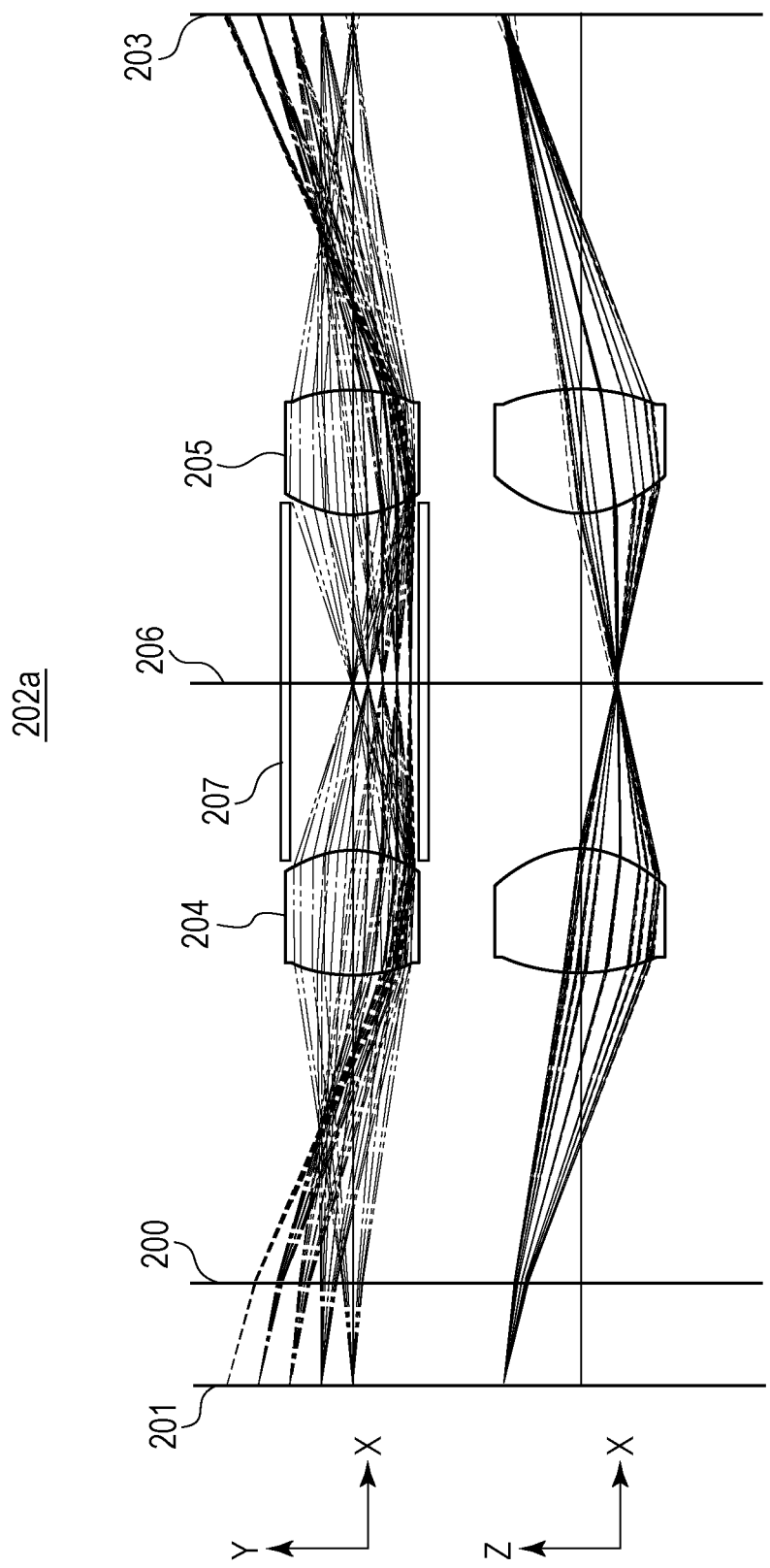

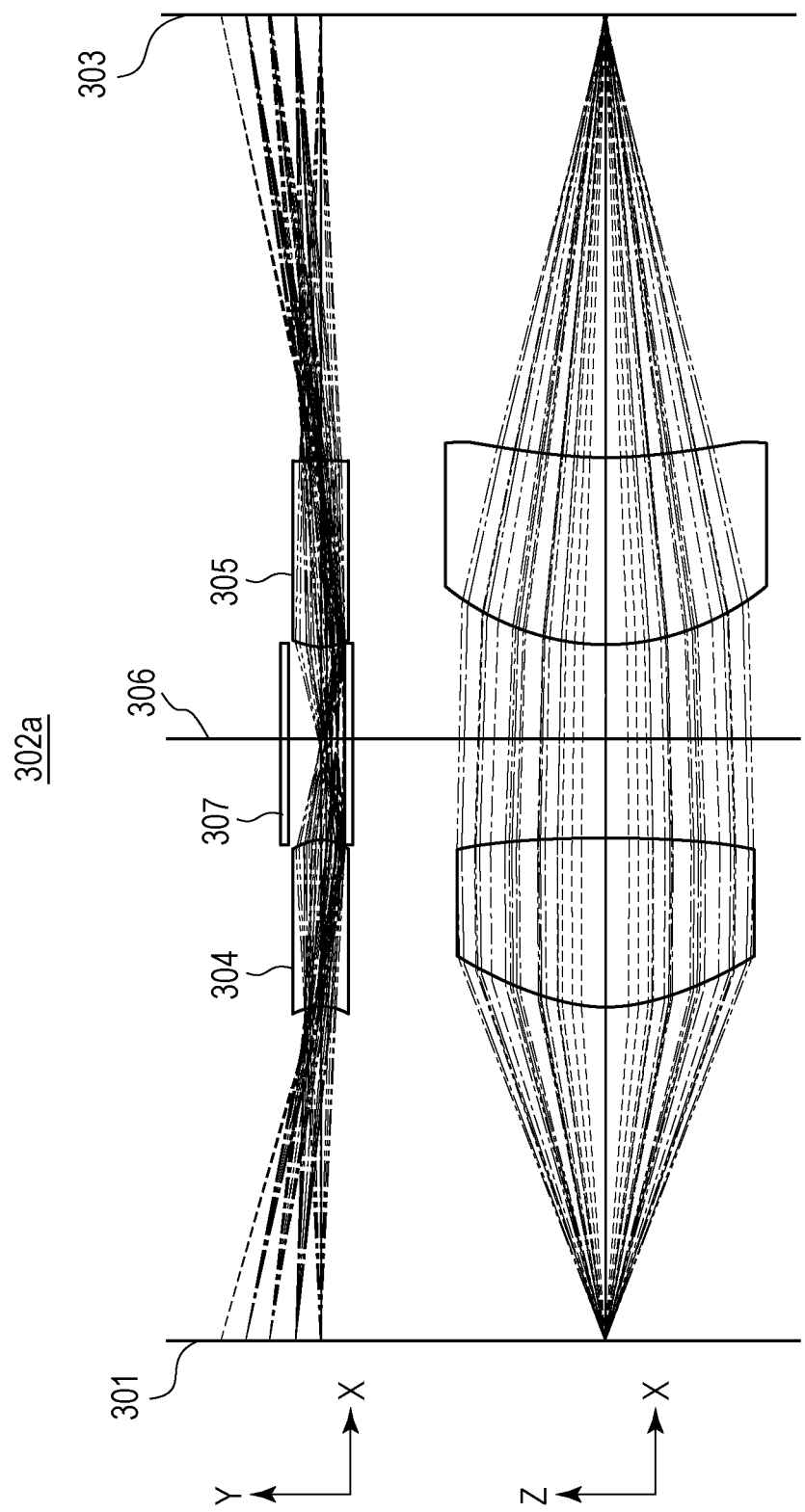

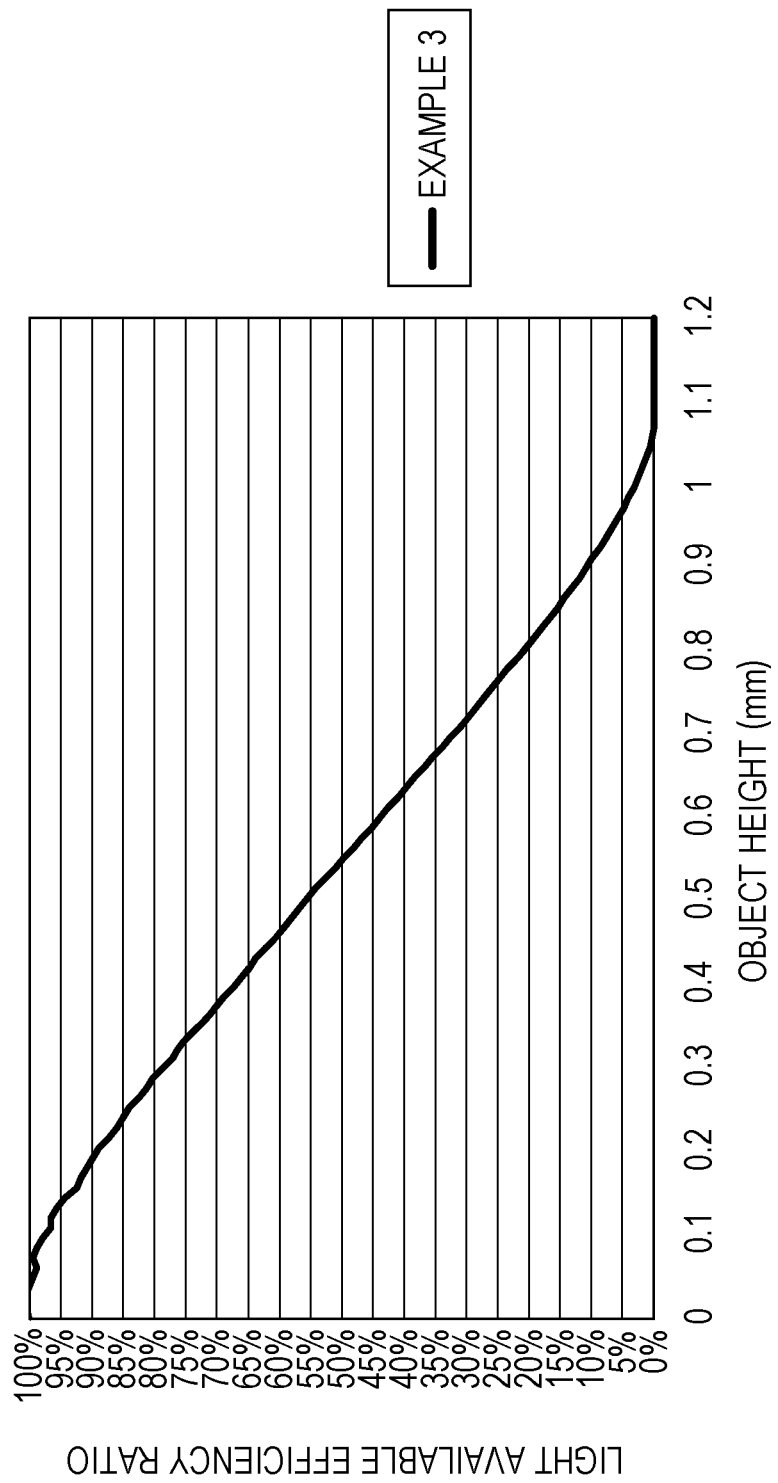

LENS ARRAY, IMAGING APPARATUS, AND IMAGE READING APPARATUS

BACKGROUND OF THE INVENTION

1. Field of the Invention

This disclosure relates to a lens array, and is suitable for a lens array used, for example, in an imaging apparatus, or an image reading apparatus.

2. Description of the Related Art

Recently, imaging apparatuses and image reading apparatuses using a lens array composed of a small diameter lens array have been developed. In this configuration, reductions in the size and cost of the apparatus may be realized in comparison with a configuration in which a photosensitive member is scanned using by a polygon mirror and a configuration in which images are readby using a plurality of lenses or mirrors.

However, such a lens array has a problem that unevenness of light amount distribution in image formation (unevenness of light amount distribution) may develop on an image plane (which corresponds to a sensor plane in an image reading apparatus, and to a photosensitive plane in an imaging apparatus). When unevenness of light amount distribution develops, formed images formed by the imaging apparatus and read images read by the image reading apparatus may be formed with stripes and consequently, degradation of the image quality of the formed images and the read images may result.

Technologies for solving the problem described above are proposed in US2006/0176361 and Japanese Patent Laid-Open No. 2002-318348. A configuration in which light-emitting intensities of respective light-emitting elements of a light source array are modulated to reduce the unevenness of light amount distribution is disclosed in US2006/0176361. A configuration in which an array pitch of respective imaging units which constitute a lens array is set to a value in an appropriate range to reduce the unevenness of light amount distribution is disclosed in Japanese Patent Laid-Open No. 2002-318348.

However, even though the unevenness of light amount distribution is reduced by the configurations disclosed in US2006/0176361 and Japanese Patent Laid-Open No. 2002-318348, if a change (deformation or a change of refractive index) occurs in the respective imaging portions which constitute the lens array due to a temperature change or the like, the unevenness of light amount distribution may show up again on the image plane.

SUMMARY OF THE INVENTION

This disclosure provides a lens array which prevents unevenness of light amount distribution from being easily changed even though any change occurs due to a temperature change or the like in respective imaging portions which constitute the lens array.

This disclosure provide a lens array including: a plurality of imaging portions arrayed in a first direction; wherein each of the plurality of imaging portions includes a first optical system configured to form an intermediate image of an object and a second optical system configured to re-form the intermediate image of the object in a first cross section parallel to the first direction and a direction of optical axes of the imaging portions, and wherein in each of the plurality of imaging portions, an optical flux from an object height at which a light available efficiency becomes 90% is restricted by at least one of a first aperture surface of the first optical system and a second aperture surface of the second optical system, and the optical flux from an object height at which the light available efficiency becomes 10% is restricted by the aperture surface which restricts the optical flux from the object height at which the light available efficiency becomes 90%.

Further features of the present invention will become apparent from the following description of exemplary embodiments with reference to the attached drawings.

BRIEF DESCRIPTION OF THE DRAWINGS

FIG. 3 illustrates a first cross section and a second cross section of an imaging portion of Example 1.

FIG. 7 is a drawing for explaining vignetting on a lens surface of Comparative Example 1.

FIG. 14 illustrates a first cross section and a second cross section of an imaging portion of Example 2.

FIG. 21 illustrates a first cross section and a second cross section of an imaging portion of Example 3.

FIG. 23 is a graph of a relationship between the object height and the light available efficiency of the imaging portion, showing a relationship in Example 3.

DESCRIPTION OF THE EMBODIMENTS

Figure 1A:
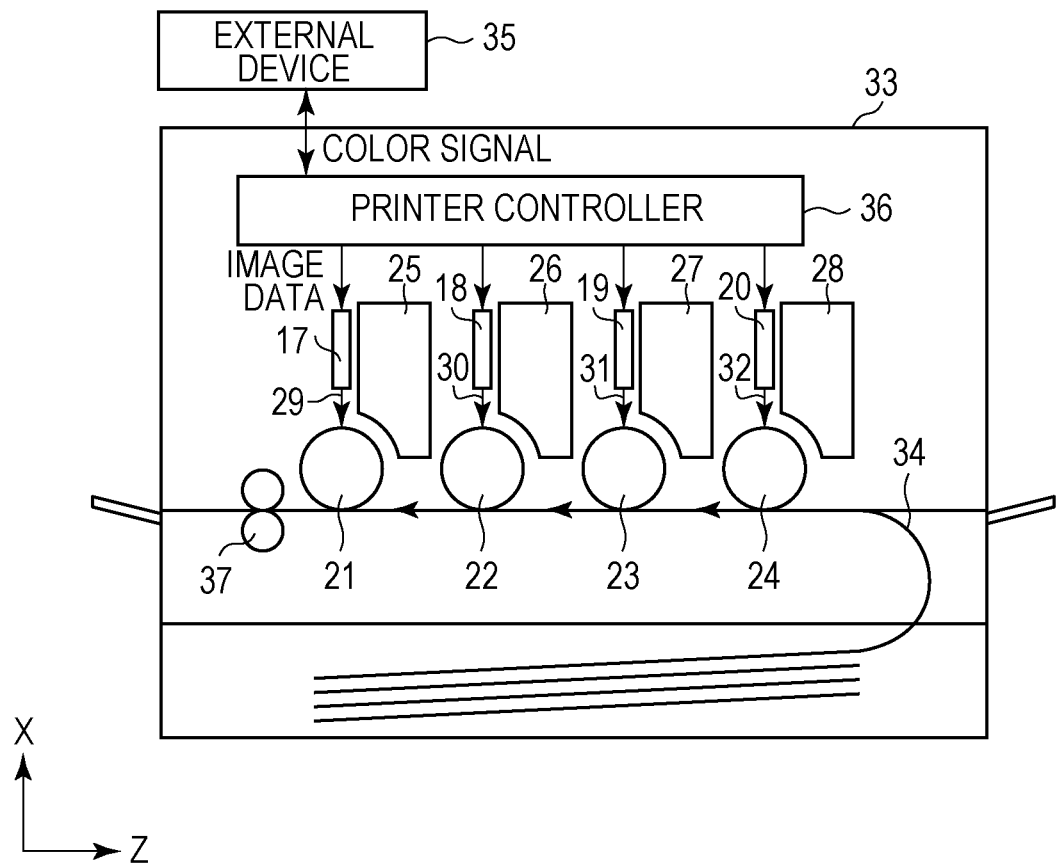
FIGS. 1A and 1B are schematic drawings illustrating an imaging apparatus and an image reading apparatus according to an embodiment disclosed here.

Referring now to the drawings, preferred embodiments of this disclosure will be described below.

Figure 1B:
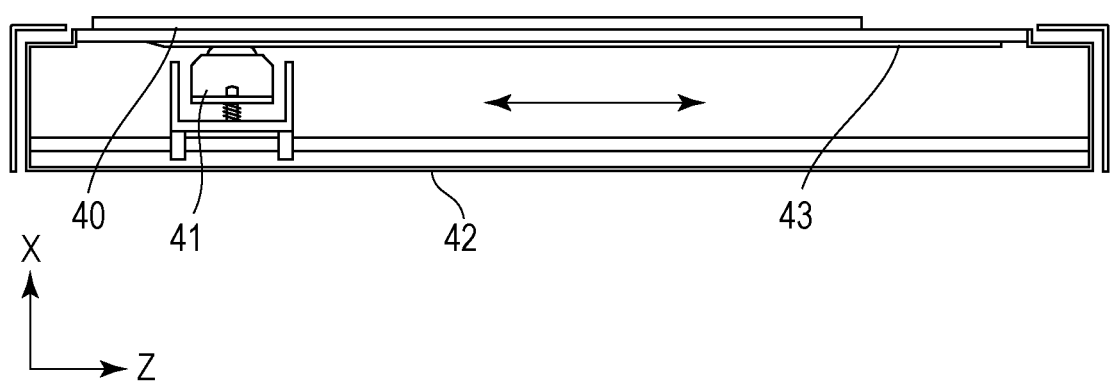

FIGS. 1A and 1B are schematic drawings illustrating an imaging apparatus and an image reading apparatus according to the embodiment disclosed here (detailed illustration will be given later). In the embodiment disclosed here, lens arrays are arranged in the interiors of the exposure units 17 to 20 of a color imaging apparatus 33 and in the interior of a reading unit 41 of an image reading apparatus 44. The respective apparatuses may be reduced in size by using the lens arrays.

Figure 2A:
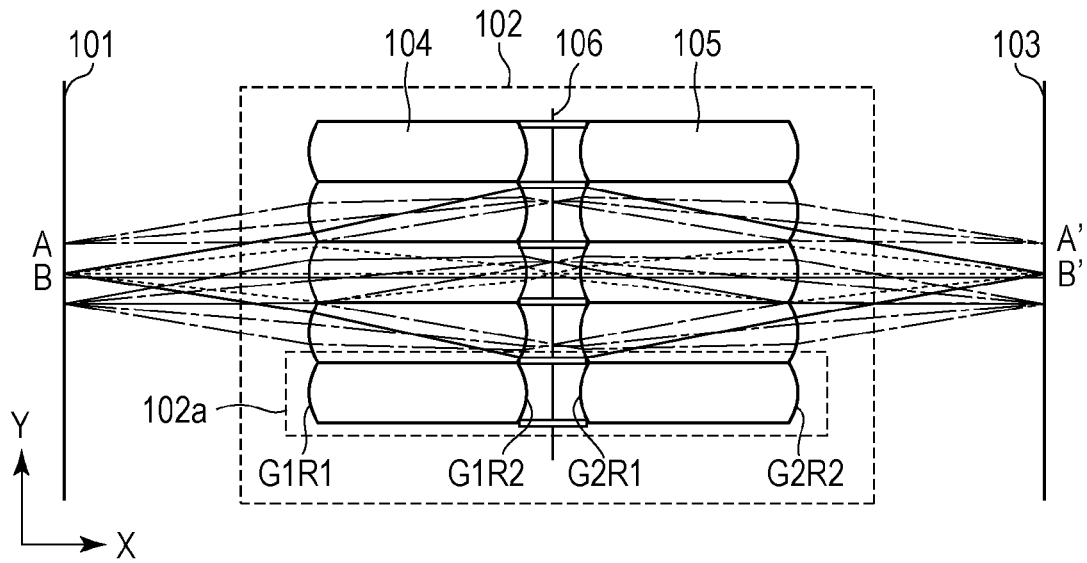
FIGS. 2A to 2C are schematic drawings of a principal portion of a lens array of Example 1.

A lens array of the embodiment disclosed here includes a plurality of imaging portions 102a arrayed in a first direction (Y direction) as illustrated in FIG. 2A. The plurality of imaging portions 102a are each an erecting system configured to form an image of an object at the same-magnification (erecting same-magnification imaging system) in a first cross section (XY cross section) parallel to the first direction and a direction of optical axes of the imaging portions 102a (X direction).

A lens array 102 of the embodiment disclosed here has a configuration in which aperture surfaces (aperture stop surfaces) of the plurality of imaging portions 102a do not change with the object height. Accordingly, an advantage that the unevenness of light amount distribution negligibly changes even when a change (deformation, change of refractive index, or the like) occurs in the respective imaging portions 102a due to a temperature change or the like may be obtained. In these Examples, the term "object height" corresponds to "the object height in the first direction".

The lens array of the embodiment disclosed here will be described in detail in respective Examples.

Example 1

Figure 2B:
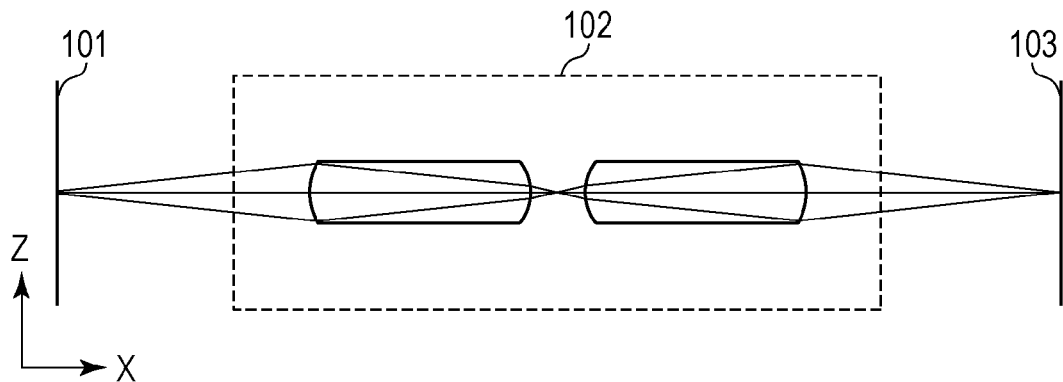
Figure 2C:
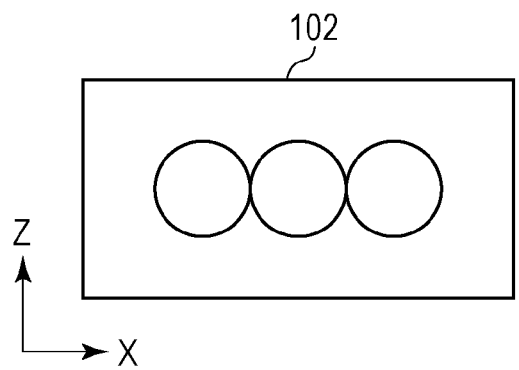

In Example 1, a case where the lens array is arranged in an exposure unit of the imaging apparatus as illustrated in FIG. 1A will be described. FIGS. 2A to 2C are schematic drawings illustrating a principal portion of the lens array 102 of Example 1. FIG. 2A illustrates the first cross section (XY cross section) parallel to the first direction and the direction of optical axes of the imaging portions 102a, FIG. 2B illustrates a second cross section (ZY cross section) perpendicular to the first direction, and FIG. 2C illustrates a front view viewed from the direction of the optical axes of the imaging portions 102a. The lens array 102 of Example 1 includes the plurality of imaging portions 102a arrayed at a 0.57 mm arrangement period (pitch) in the first direction. The plurality of imaging portions 102a are arranged in one level in a second direction (Z direction) perpendicular to the first direction and the direction of the optical axes of the imaging portions 102a.

The imaging portions 102a in the exposure unit are each a system that forms erecting same-magnification images of a plurality of light-emitting points of a light source 101 (erecting same-magnification imaging system) in the first cross section and the second cross section. In other words, an optical flux that emerges from one of the light-emitting points of the light source 101 and passes through the lens array 102 is condensed to one point on the photosensitive surface 103. For example, as illustrated in FIG. 2A, an optical flux from a light-emitting point A of the light source 101 is converged on an imaging point A' on the photosensitive surface 103, and an optical flux from a light-emitting point B is converged on an imaging point B' on the photosensitive surface 103. In this configuration, exposure corresponding to the light-emitting state of the light source 101 is enabled.

Here, as illustrated in FIG. 2A, the lens array 102 of Example 1 forms an image of one light-emitting point (object point) by means of at least two of the imaging portions 102a. In this configuration, since the number of optical fluxes which contribute to image formation may be increased in comparison with a configuration in which an image of the one object point is formed by the one imaging portion 102a, an advantage of a reduction of the unevenness of light amount distribution is achieved.

Since the plurality of light-emitting points of the light source 101 are arrayed equidistantly (several tens of μm) in the first direction, which is at a pitch sufficiently smaller than the distance between the adjacent imaging portions 102a (several hundreds of μm or larger), the respective light-emitting points are considered to exist substantially continuously. The light source 101 here may be one in which a plurality of rows of a plurality of the light-emitting points arrayed equidistantly in the first direction are arrayed in the second direction so that the plurality of light-emitting points are arrayed in a zigzag pattern. In this configuration, the distance between the light-emitting points which are adjacent to one another in the first direction may have an allowance. The light-emitting points which constitute the light source 101 may be, for example, LEDs or organic EL elements (organic light-emitting elements).

Here, the imaging portions 102a which constitute the lens array 102 will be described in detail.

As illustrated in FIG. 3, each of the imaging portions 102a includes a first optical system (G1 lens 104) and a second optical system (G2 lens 105) arranged on the same optical axis. Here, the optical system which forms an intermediate image of the light source (object plane) 101 is defined as the first optical system and a plane on which the first optical system forms the intermediate image is defined as an intermediate imaging plane 106. An optical system configured to form the intermediate image formed on the intermediate imaging plane 106 again on the photosensitive surface (image surface) 103 is defined as the second optical system. In Example 1, the first optical system and the second optical system are symmetric with respect to the intermediate imaging plane 106, and hence the same member may be used for both of the optical systems.

In Example 1, the first optical system is composed only of the G1 lens 104, and the second optical system is composed only of the G2 lens 105. The imaging portions 102a may be composed of three or more lenses. In other words, at least one of the first optical system and the second optical system may be composed of two or more lenses. However, since the number of components is increased if three or more lenses are employed for constituting each of the imaging portions 102a, a configuration having two lenses as Example 1 is preferable. Alternatively, each of the imaging portions 102a which constitute the lens array 102 of Example 1 may be composed of a single lens. This case may be considered to be the same as the configuration having two or more lenses as described above by configuring the single lens to be the erecting same-magnification imaging system, and defining a section from an object surface to the intermediate imaging plane to be the first optical system and a section from the intermediate imaging surface to the image surface to be the second optical system.

A light-shielding member 107 is arranged between the G1 lens 104 and the G2 lens 105. The light-shielding member 107 has a role of blocking an optical flux that would otherwise pass through the G1 lens 104 of each of the imaging portions 102a and enter the G2 lens 105 of another one of the imaging portions 102a (stray light which does not contribute to image formation).

As illustrated in FIG. 2C, surfaces (G1R1 surface, G1R2 surface, G2R1 surface, and G2R2 surface) of lens surfaces (light incident surfaces R1 and light outgoing surface R2) of the G1 lens 104 and the G2 lens 105 of each of the imaging portions 102a are aspherical surfaces having rotational symmetry. In this configuration, machining of the lens forming die is facilitated. In Example 1, since the aperture surfaces (lens surfaces) of the G1 lens 104 and the G2 lens 105 have a circular shape, an advantage that formation of the aperture surface may be further facilitated is achieved.

Here, defining that an intersection between each of the lens surface of the imaging portion 102a and an optical axis (X axis) is an origin point, and an axis orthogonal to the optical axis in the first direction is a Y-axis, and an axis orthogonal to the optical axis in the second direction is a Z-axis, the shape of the aspherical surface is expressed by an aspherical surface expression (1) given below.

[Expression 1]

$$x = \frac{\frac{y^2+z^2}{R}}{1+\sqrt{1-(1+k)\left(\frac{\sqrt{y^2+z^2}}{R}\right)^2}} + \sum_{i=1}^{n} A_{2i}(y^2+z^2)^{2i} \quad (1)$$

where, R is a radius of curvature, k is a constant of the cones, $A_{2i}$ (i=1, 2, 3, ...) are aspherical surface coefficients.

Various characteristic values of the imaging portions 102a of Example 1 will be shown in Table 1.

TABLE 1

| | | | | aspherical shape | | | |
|---|---|---|---|---|---|---|---|
| configuration | light source wavelength | 700 | nm | | | | |
| | G1 refractive index (light source wavelength) | 1.54 | | | G1R1 | | G2R2 |
| | G2 refractive index (light source wavelength) | 1.54 | | R | 0.5608 | R | −0.5608 |
| | intermediate imaging magnification β in first cross section | −0.51 | | k | −1.1222 | k | −1.1222 |
| | array pitch p in first direction | 0.57 | mm | | G1R2 | | G2R1 |
| effective diameter | G1R1 (first direction and second direction) | 0.4 | mm | R | −4.95E−01 | R | 4.95E−01 |
| | G1R2 (first direction and second direction) | 0.56 | mm | k | −9.78E−01 | k | −9.78E−01 |
| | G2R1 (first direction and second direction) | 0.56 | mm | A2 | 0.0000 | A2 | 0.0000 |
| | G2R2 (first direction and second direction) | 0.4 | mm | A4 | −1.0930 | A4 | 1.0930 |
| arrangement | distance between object surface and G1R1 | 2.485 | mm | | | | |
| | distance between G1R1 and G1R2 | 2.168 | mm | | | | |
| | distance between G1R2 and G2R1 | 0.534 | mm | | | | |
| | distance between G2R1 and G2R2 | 2.168 | mm | | | | |
| | distance between G2R2 and image surface | 2.485 | mm | | | | |

An intermediate imaging magnification β shown in Table 1 corresponds to a paraxial imaging magnification on the intermediate imaging plane 106 of the first optical system in the first cross section. In Example 1, the intermediate imaging magnification β in the first cross section of each of the imaging portions 102a is set to be −0.51. However, the value β may take any value as long as the imaging portion 102a is included within a range that the imaging portion 102a becomes the erecting same-magnification imaging system in the first cross section.

Subsequently, a lens array in which the respective imaging portions have various characteristic values as shown in Table 2 will be considered as Comparative Example 1 in order to explain advantages of the lens array of Example 1. The imaging portion of Example 1 is different from the imaging portion of Comparative Example 1 only in terms of the effective diameters of the G1R1 surface and the G2R2 surface in the first direction and the second direction. Components the same as or equivalent to those of Example 1 are denoted by the same reference signs, and the description thereof is simplified or omitted.

TABLE 2

| | | | | aspherical shape | | | |
|---|---|---|---|---|---|---|---|
| configuration | light source wavelength | 700 | nm | | | | |
| | G1 refractive index (light source wavelength) | 1.54 | | | G1R1 | | G2R2 |
| | G2 refractive index (light source wavelength) | 1.54 | | R | 0.5608 | R | −0.5608 |
| | intermediate imaging magnification β in first cross section | −0.51 | | k | −1.1222 | k | −1.1222 |
| | array pitch p in first direction | 0.57 | mm | | G1R2 | | G2R1 |

TABLE 2-continued

| | | | | | | | |
|---|---|---|---|---|---|---|---|
| effective | G1R1 (first direction and second direction) | 0.56 mm | R | −4.95E−01 | R | 4.95E−01 |
| diameter | G1R2 (first direction and second direction) | 0.56 mm | k | −9.78E−01 | k | −9.78E−01 |
| | G2R1 (first direction and second direction) | 0.56 mm | A2 | 0.0000 | A2 | 0.0000 |
| | G2R2 (first direction and second direction) | 0.56 mm | A4 | −1.0930 | A4 | 1.0930 |
| arrangement | distance between object surface and G1R1 | 2.485 mm | | | | |
| | distance between G1R1 and G1R2 | 2.168 mm | | | | |
| | distance between G1R2 and G2R1 | 0.534 mm | | | | |
| | distance between G2R1 and G2R2 | 2.168 mm | | | | |
| | distance between G2R2 and image surface | 2.485 mm | | | | |

Figure 4:
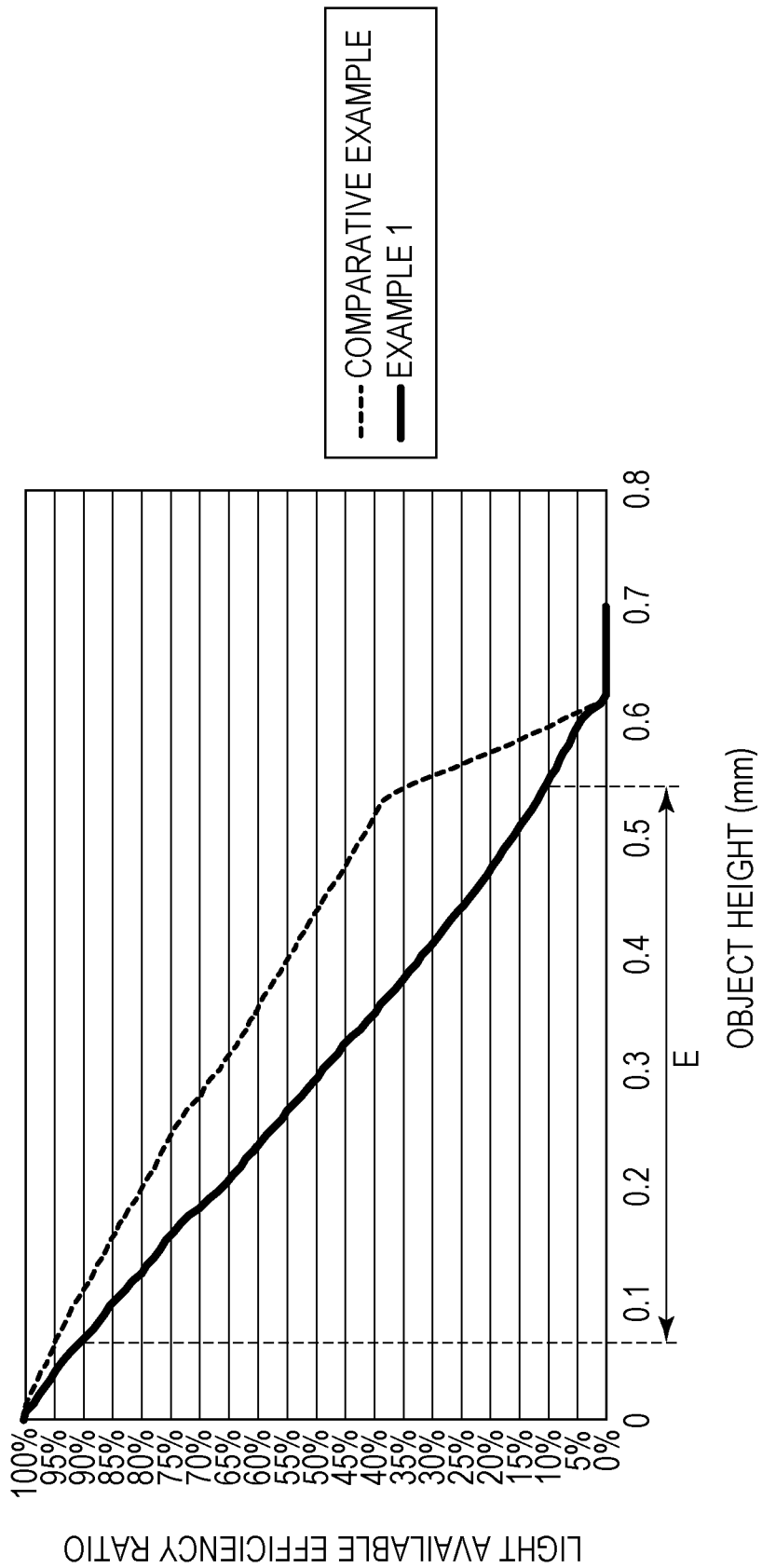
FIG. 4 is a graph of a relationship between an object height and a light available efficiency of an imaging portion, showing relationships in Example 1 and Comparative Example 1.

FIG. 4 shows a light available efficiency ratio with respect to the object height when the light available efficiency with respect to an optical flux from an object height on the optical axis (axial object height) at the one imaging portion of Comparative Example 1 is normalized as 100%. The light available efficiency corresponds to a ratio of the light amount condensed on the image surface (the photosensitive surface 103) with respect to the light amount of the optical flux emerging from the object surface (the light source 101), and is calculated by multiplying an aperture efficiency (substantially proportional to the surface area of passage of the optical flux) and transmissivity of the imaging portion. As is understood from FIG. 4, the light available efficiency ratio in Comparative Example 1 decreases as the position of the light-emitting point moves away from the object height 0 (axial object height). The object height at which the light amount which forms an image on the image surface becomes substantially zero is described as an outermost object height below. At this time, in the same manner as Japanese Patent Laid-Open No. 2002-318348, a profile of the line on the graph includes a bent point.

Figure 5A:
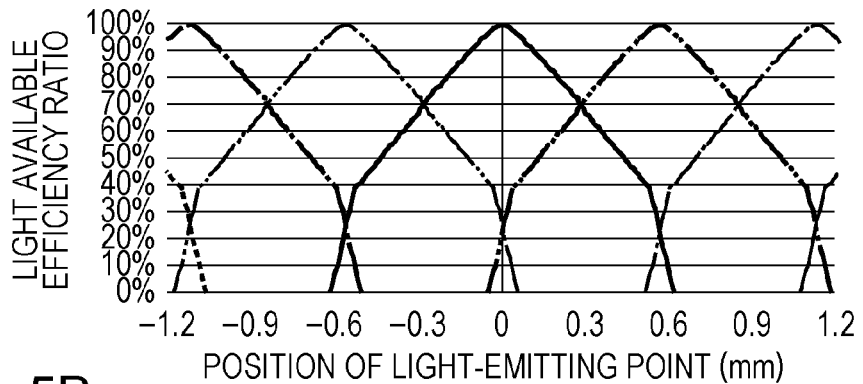
FIGS. 5A to 5D are drawings for explaining unevenness of light amount distribution occurring in Comparative Example 1 (before the temperature change).

Considering the ratios of the light available efficiency when optical fluxes from the respective light-emitting points pass through the plurality of imaging portions and are condensed on the image surface, the light available efficiency ratio at every position of the light-emitting point varies as illustrated in FIG. 5A. Here, the respective light-emitting points of the light source are assumed to exist substantially continuously in the first direction. As is understood from FIG. 5A, the distribution of the light available efficiency ratio lies on an up-and-down shape having apexes at intervals of an array pitch of the imaging portions, and the respective apexes (the light available efficiency 100%) correspond to the optical axes of the respective imaging portions.

Figure 5B:
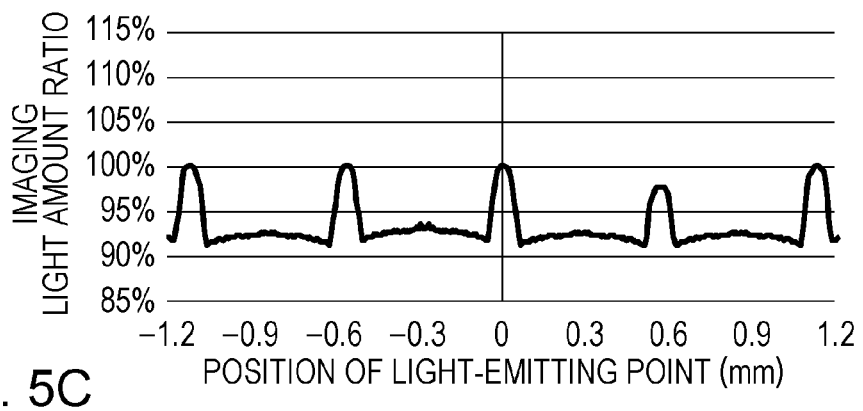

FIG. 5B illustrates the imaging light amount ratio with respect to the position of the light-emitting point. Here, the imaging light amount is proportional to a value obtained by adding up the light available efficiencies at the respective imaging portions at every position of the light-emitting point, and the imaging light amounts with respect to the positions of the axial light-emitting points of the respective imaging portions are normalized as 100% in FIG. 5B. From FIG. 5B, it is understood that unevenness of imaging light amount is generated at every position of light-emitting point. The unevenness of the imaging light amount is caused by a change of an optical path in accordance with the positions of the light-emitting points and difference of the light available efficiency from one position of the light-emitting point to another in the lens array.

Accordingly, a case where an emitting light amount of each of the light-emitting points is electrically corrected against the unevenness of the imaging light amount illustrated in FIG. 5B in the same manner as in the configuration described in US2006/0176361 is considered. In other words, the emitting light amount at every light-emitting point is corrected so that the emitting light amount ratio at every position of light-emitting point (normalized so that the emitting light amount at the axial light-emitting point corresponds to 100%) lies on the line illustrated in FIG. 5C. Accordingly, the imaging light amount ratio after the correction of the emitting light amount at every position of the light-emitting point (corrected light amount) lies on the line illustrated in FIG. 5D, and the unevenness of the imaging light amount may be reduced.

Figure 5C:
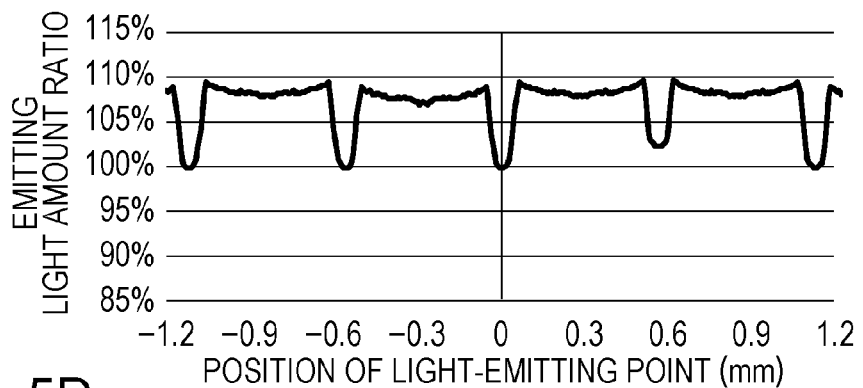
Figure 5D:
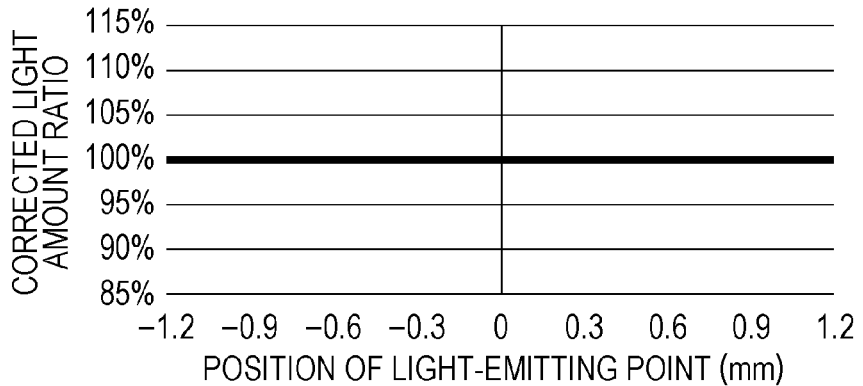
Figure 6A:
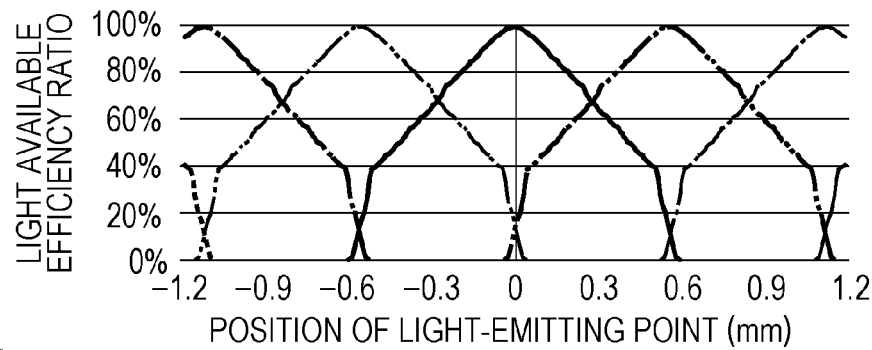
FIGS. 6A to 6D are drawings for explaining the unevenness of light amount distribution occurring in Comparative Example 1 (after the temperature change).
Figure 6B:
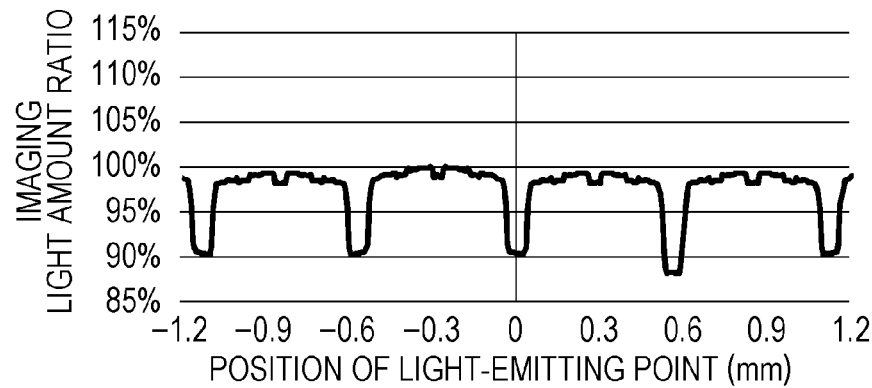
Figure 6C:
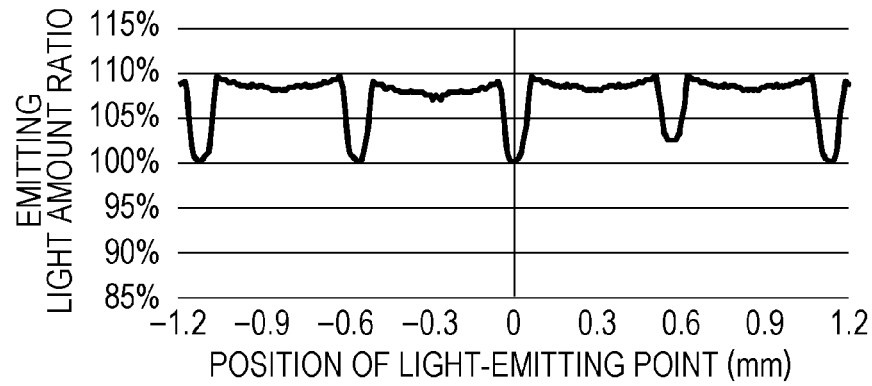
Figure 6D:
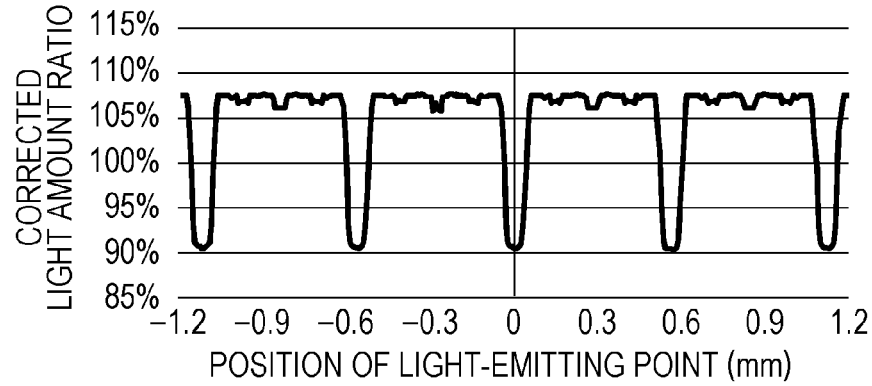

However, when a change (deformation, change of refractive index, or the like) occurs in the respective imaging portions due to a temperature change, the corrected imaging light amount may be changed as described above. As an example, a case where the distribution of the light available efficiency varies due to a change in curvature of the respective imaging portions due to a temperature increase, and the outermost object height is decreased by 5% will be considered. The light available efficiency ratio, imaging light amount ratio, the emitting light amount ratio, and the corrected light amount ratio at every position of light-emitting point are illustrated in FIGS. 6A to 6D, respectively. As is understood when comparing FIGS. 5A and 5B with FIGS. 6A and 6B, the light available efficiency and the imaging light amount are changed by a temperature increase. However, the emitting light amount of each of the light-emitting points, being determined by the unevenness of the imaging light amount before the temperature increase, is not changed by the temperature increase, as illustrated in FIG. 5C and FIG. 6C. Therefore, unevenness of the light amount distribution shows up as illustrated in FIG. 6D in comparison with the corrected light amount ratio before the temperature increase occurs illustrated in FIG. 5D, and a p-p value (peak-to-peak value) of the graph is 17% (p-p 17%).

The change of the imaging portion due to a temperature change or the like appears basically as broadening of the distribution of the graph of the position of the light-emitting point with respect to the light available efficiency (imaging light amount). In other words, as is understood from the comparison of FIGS. 5A and 5B with FIGS. 6A and 6B, the unevenness of the light amount distribution caused by the temperature change or the like depends on a change of the degree of overlapping of the lines on the graph in the vicinity of the outermost object height. In other words, the unevenness of the light amount distribution caused by a temperature change or the like is proportional to the inclination of the lines in the vicinity of the outermost object height on the graph of the position of the light-emitting point with respect to the light available efficiency. Therefore, since the unevenness of the light amount distribution is increased with increase in inclination of the lines, in order to prevent the unevenness of the light amount distribution from being easily changed in response to the change of the imaging portion due to the temperature change or the like, the inclination of the lines of the portion in the vicinity of the outermost object height may be made gentle.

As is understood from FIG. 4, in this Comparative Example 1, the inclination of the line on the graph of the object height (the position of the light-emitting point) with respect to each of the imaging portions with respect to the light available efficiency ratio becomes steep from the object height of 0.53 mm where a bending point appears onward. Optical paths of optical fluxes from the object heights of 0.51 mm, 0.53 mm, and 0.55 mm in the vicinity of the bending point are illustrated in FIG. 7. At the object heights of 0.51 mm and 0.53 mm, vignetting of the optical fluxes occurs on the G1R1 surfaces of the G1 lens 104 and the G2R2 surfaces of the G2 lens 105. However, at the object height of 0.55 mm, it is understood that vignetting of the optical fluxes occurs on the G1R2 surfaces of the G1 lens 104 and the G2R1 surfaces of the G2 lens 105, and hence the vignetting occurs on the lens surfaces different from other object heights.

From the reason described above, the reason why the inclination of the line on the graph of the object height (the position of the light-emitting point) with respect to the light available efficiency ratio becomes steep seems to be because the surfaces of the imaging portions on which the vignetting occurs, that is, the aperture surfaces which restrict the optical fluxes (the aperture stop surfaces) change with the position of the light-emitting point. In other words, if the imaging portion whose aperture surface does not change with the position of the light-emitting point is achieved, the inclination of the line on the graph of the position of the light-emitting point with respect to the light available efficiency ratio does not becomes steep and hence a lens array which prevents the unevenness of the light amount distribution from being easily changed in response to the change of the imaging portion is achieved.

Figure 8A:
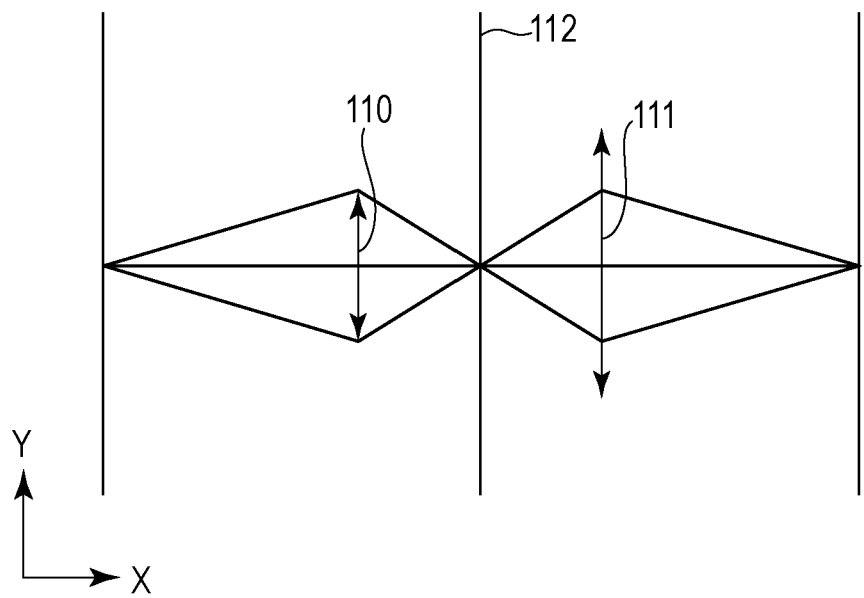
FIGS. 8A and 8B illustrate a first cross section of an ideal imaging portion.
Figure 8B:
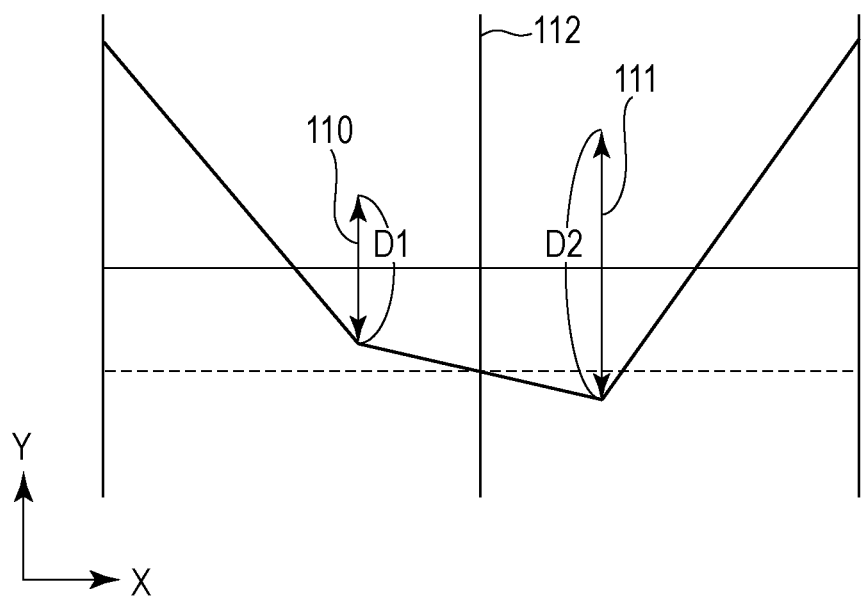

Since the vignetting occurs on at least two aperture surfaces in the imaging portion of Example 1, a configuration in which the number of the aperture surfaces does not exceed two surfaces may be devised. In order to explain this point, the XY cross section when considering a general erecting same-magnification imaging system as an ideal imaging portion is illustrated in FIGS. 8A and 8B. FIGS. 8A and 8B illustrate a state in which an optical flux from the axial object height passes through the ideal imaging portion and a state in which an optical flux from the outermost object height passes through the ideal imaging portion, respectively. The ideal imaging portion includes two convex lenses of a first ideal lens 110 having an effective diameter of D1 and a second ideal lens 111 having an effective diameter of D2 arranged symmetrically with respect to an intermediate imaging plane 112. Here, the effective aperture D1 and the effective aperture D2 are differentiated from each other for the purpose of explanation.

It is understood from FIGS. 8A and 8B that the vignetting depends on the effective diameters of the first ideal lens 110 and the second ideal lens 111. In the ideal imaging portion, "the surface on which the vignetting occurs changes with the object height" corresponds to "the effective diameter of the ideal lens changes with the object height". In other words, in order to prevent the surface where the vignetting occurs from changing, a configuration in which the effective diameters of the first ideal lens 110 and the second ideal lens 111 do not change with the object height is effective.

The effective diameter corresponding to the axial object height is determined by the aperture surface which restricts the optical flux from the axial object height. In other words, if the surface which restricts the optical fluxes at the respective object heights does not change from this state, the effective diameter of the ideal lens does not change with the object height. In other words, in the ideal imaging portion, a configuration in which the surface which determines the effective diameter corresponding to the outermost object height becomes equal to the aperture surfaces of the first ideal lens 110 and the second ideal lens 111. In the description given below, the surface which restricts the optical flux from the axial object height corresponds to the axial aperture surface, and the surface which restricts the optical flux from the outermost object height corresponds to the outermost aperture surface.

Figure 9A:
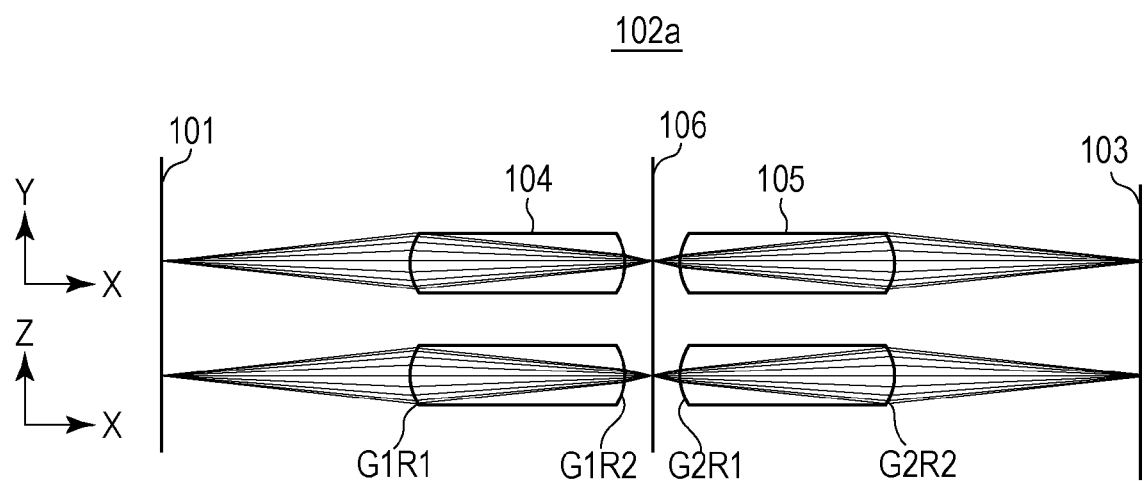
FIGS. 9A and 9B are drawings for explaining an axial aperture surface and an outermost aperture surface of Comparative Example 1.
Figure 9B:
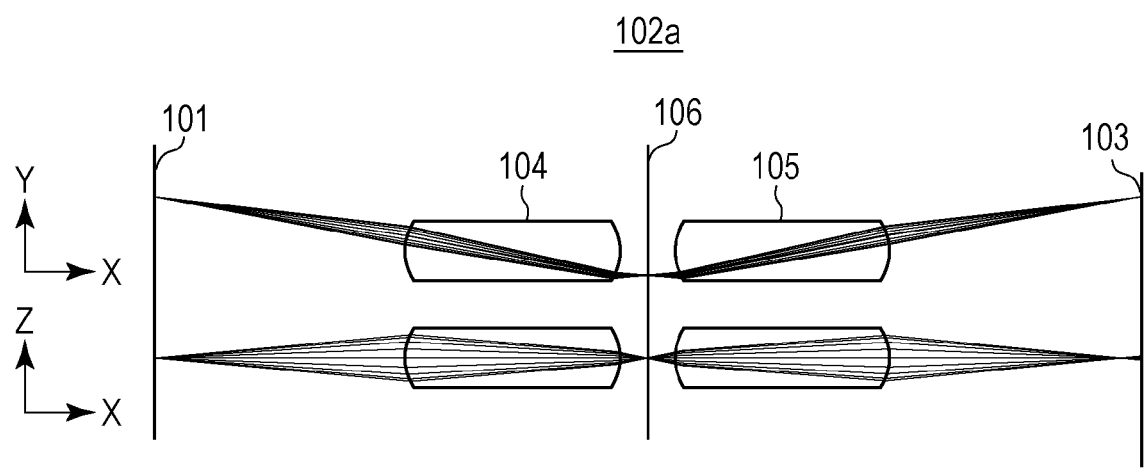

FIGS. 9A and 9B are drawings illustrating a state in which the respective optical fluxes from the axial object height and the outermost object height pass through one of the imaging portions 102a which constitute the lens array 102 of Comparative Example 1.

In FIG. 9A, in both of the XY cross section and the ZY cross section, the axial aperture surface of the first optical system is the G1R1 surface (the light incident surface) and the axial aperture surface of the second optical system is the G2R2 surface (the light outgoing surface). In FIG. 9B, in the XY cross section, the outermost aperture surface of the first optical system is the G1R1 surface and the G1R2 surface and the outermost aperture surface of the second optical system is the G2R1 surface and G2R2 surface. In contrast, in the ZX cross section, the outermost aperture surface of the first optical system is only the G1R1 surface, and the outermost aperture surface of the second optical system is only the G2R2 surface.

In this manner, in Comparative Example 1, the axial aperture surface and the outermost aperture surface of the first optical system and the second optical system respectively in the XY cross section are different. Therefore, it is considered that the profile of the line on the graph in FIG. 4 has the bending point from this reason.

Therefore, Example 1 employs a configuration in which the respective lens surfaces themselves of the imaging portions 102a which constitute the lens array 102 correspond to the aperture surfaces, and the aperture surfaces do not change with the object height as a result of the respective effective diameters thereof being suitably designed. Specifically, as shown in Table 1, the respective imaging portions 102a are configured so that the effective diameter of the G1R1 surface is smaller than the effective diameter of the G1R2 surface, and the effective diameter of the G2R2 surface is smaller than the effective diameter of the G2R1 surface. Accordingly, the surfaces which restrict the optical fluxes are only the G1R1 surface (first aperture surface) and the G2R2 surface (second aperture surface), and hence the aperture surfaces of the imaging portions 102a may be made constant in all the object heights.

Figure 10A:
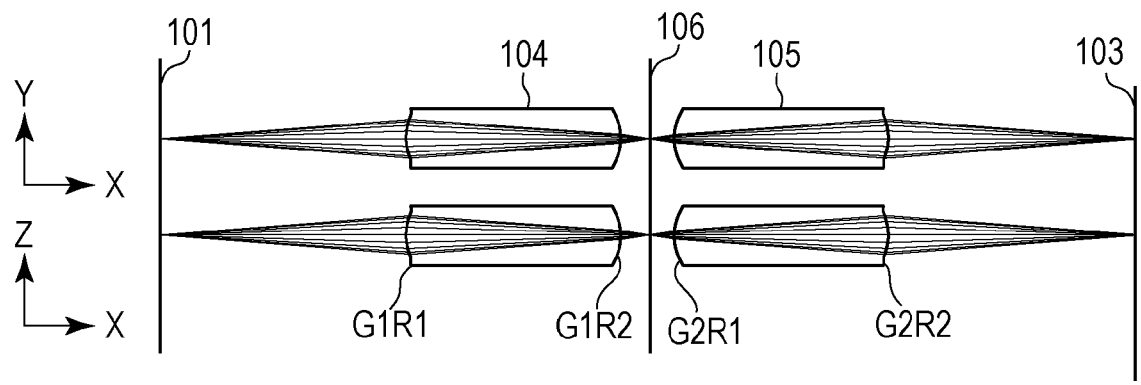
FIGS. 10A and 10B are drawings for explaining the axial aperture surface and an outermost aperture surface of Example 1.
Figure 10B:
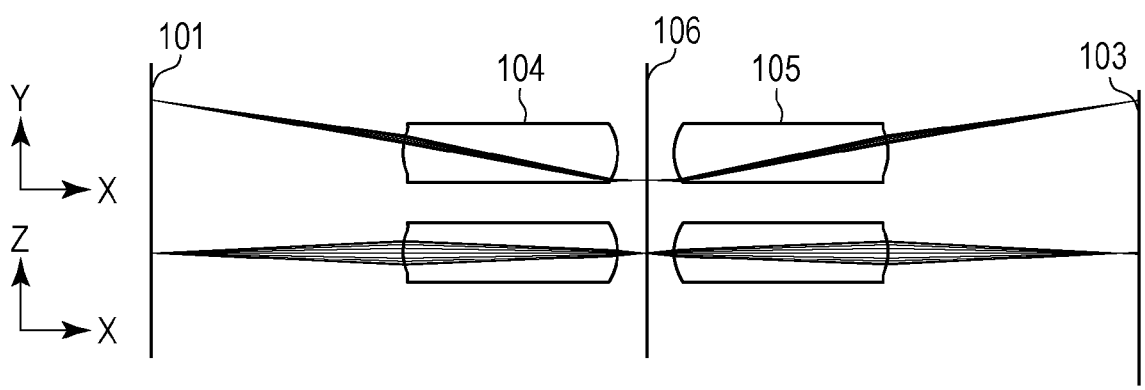
Figure 11A:
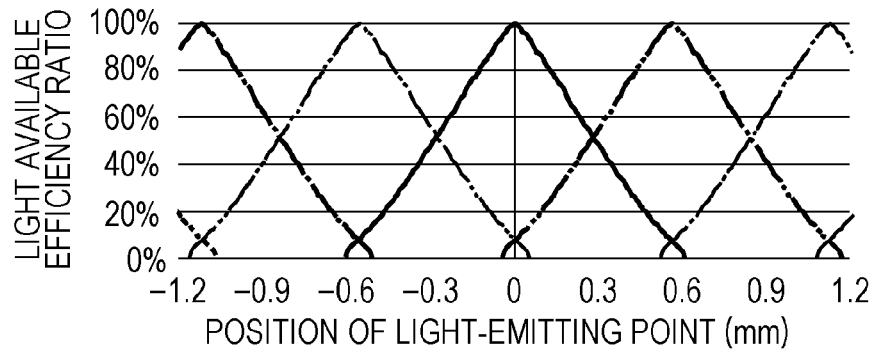
FIGS. 11A to 11D are drawings for explaining unevenness of light amount distribution occurring in Example 1 (before a temperature change).
Figure 11B:
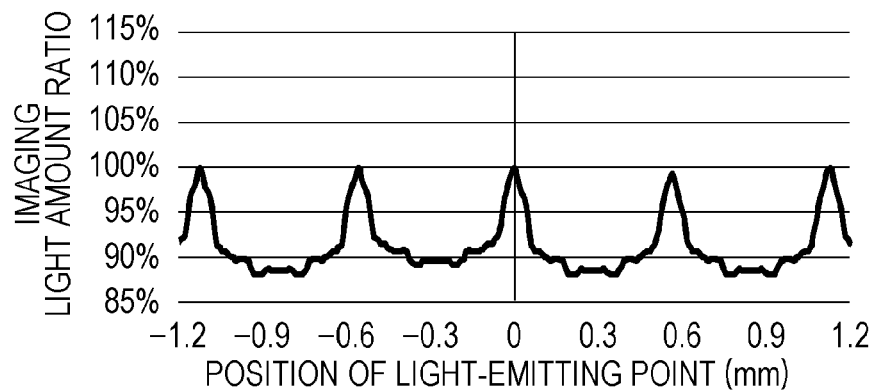
Figure 11C:
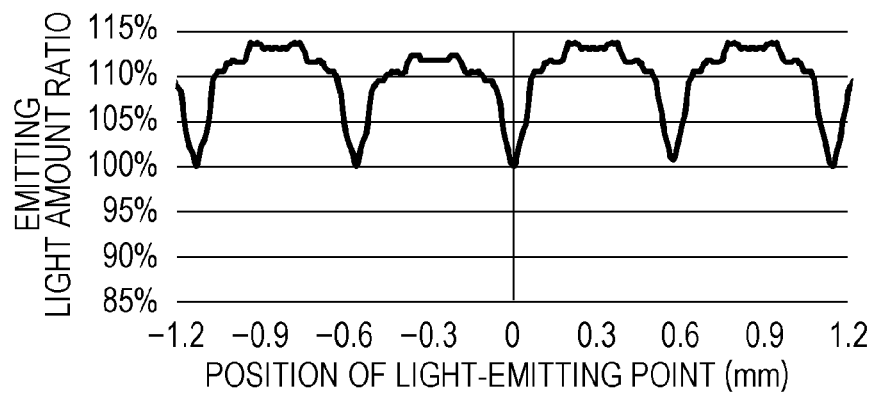
Figure 11D:
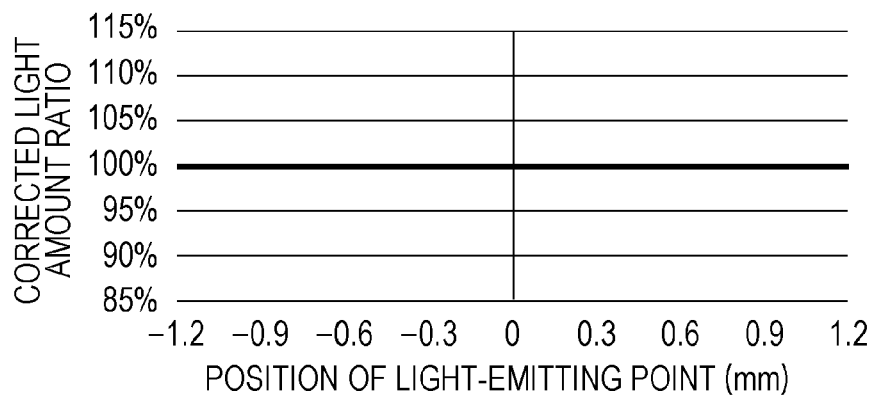

FIGS. 10A and 10B are drawings illustrating a state when the respective optical fluxes from the axial object height and the outermost object height pass through one of the imaging portions 102a which constitute the lens array 102 of Example 1. In FIG. 10A, in both of the XY cross section and the ZY cross section, the axial aperture surface of the first optical system is the G1R1 surface (the light incident surface) and the axial aperture surface of the second optical system is the G2R2 surface (the light outgoing surface). In FIG. 10B, in both of the XY cross section and the ZY cross section, the outermost aperture surface of the first optical system is the G1R1 surface and the outermost aperture surface of the second optical system is the G2R2 surface.

As described above, when the aperture surface which restricts the optical flux from the axial object height and the aperture surface which restricts the optical flux from the outermost object height are equal, the aperture surfaces which restrict the optical fluxes from other object heights are also equal. In other words, the imaging portions 102a of Example 1 each have a configuration in which the axial aperture surface and the outermost aperture surface are equal to each other in both of the first optical system and the second optical system, and hence the surface on which the vignetting occurs does not change with the object height. The imaging portions 102a of Example 1 each do not have to be provided with an aperture stop separately because the lens surfaces themselves of the G1R1 surface of the first optical system and the G2R2 surface of the second optical system correspond to the aperture surface, and hence the number of components may be reduced.

In Example 1, since the first aperture surface of the first optical system is a lens surface nearest to the object surface of the first optical system (G1R1 surface), an Fno on the side of the object may be set to be as large as possible, and hence the light available efficiency is improved. Here, in Example 1, since the first optical system and the second optical system are symmetric with respect to the intermediate imaging plane 106, the second aperture surface of the second optical system corresponds to a lens surface nearest to the image surface of the second optical system (G2R2 surface). In other words, in Example 1, the light available efficiency is further improved by setting the first aperture surface and the second aperture surface to be the optical surfaces farthest from the intermediate imaging plane 106, respectively.

Figure 12A:
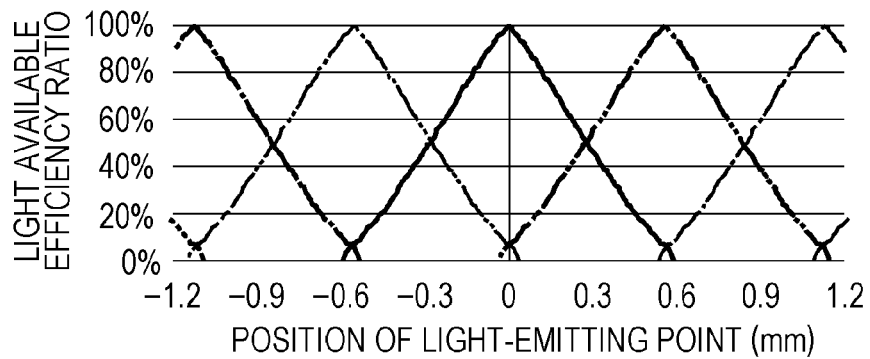
FIGS. 12A to 12D are drawings for explaining the unevenness of light amount distribution occurring in Example 1 (after the temperature change).
Figure 12B:
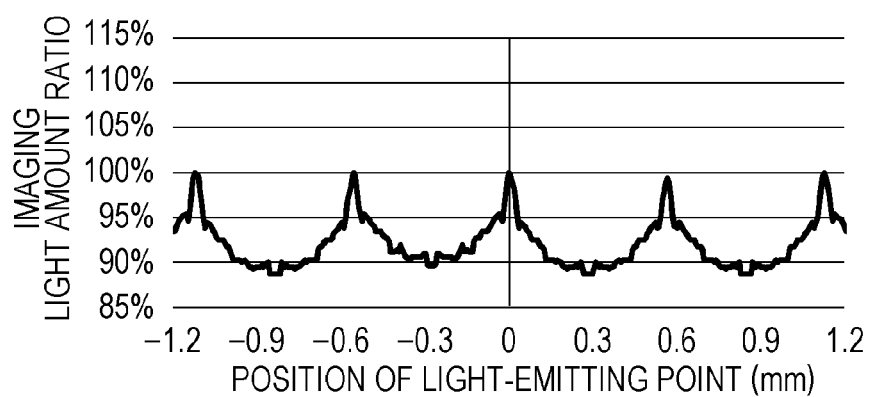
Figure 12C:
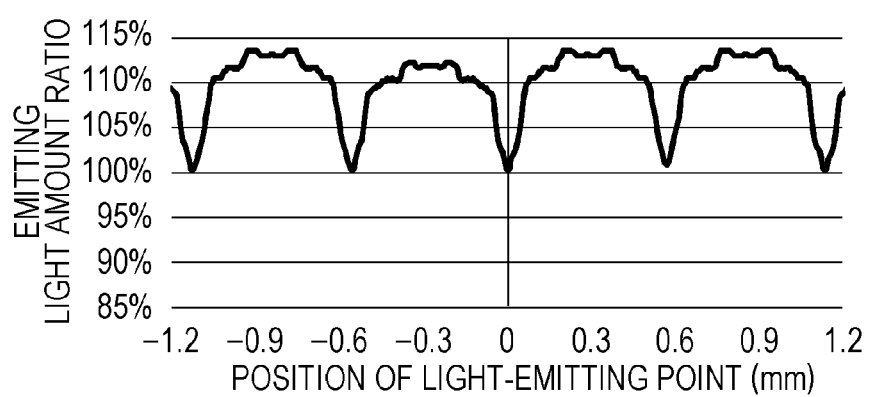
Figure 12D:
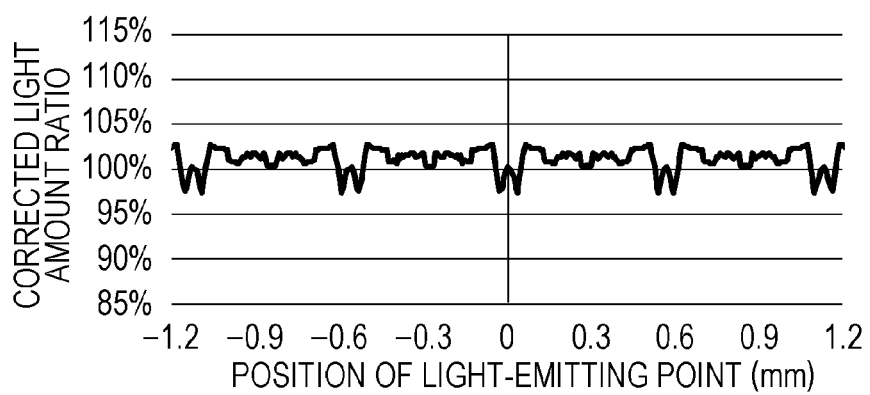

In the same manner as in Comparative Example 1, the light available efficiency ratio at each object height in one of the imaging portions of Example 1 is shown in FIG. 4. As is understood from FIG. 4, the profile of the line on the graph representing Example 1 does not have a bending point, and the inclination of the line on the graph is gentler than that of Comparative Example 1. In addition, in the same manner as Comparative Example 1, the light available efficiency ratio, the imaging light amount ratio, the emitting light amount ratio, and the corrected light amount ratio at every position of light-emitting point are illustrated in FIGS. 11A to 11D (before the temperature increase) and FIGS. 12A to 12D (after the temperature increase), respectively. In Example 1 as well, unevenness of light amount distribution of p-p 5% shows up as illustrated in FIG. 12D with respect to the corrected light amount ratio before occurrence of the temperature increase illustrated in FIG. 11D due to the change of the imaging portion caused by the temperature increase. However, the unevenness of the light amount distribution shows a significantly small value in comparison with that of Comparative Example 1 (p-p 17%).

In Example 1, the lens array is configured so that the line on the graph of the object height (the position of the light-emitting point) with respect to the light available efficiency ratio does not have any bending point and has a gentle profile at all the object heights. However, strictly speaking, the profile does not have to be gentle at all the object heights. Specifically, the advantages of this disclosure are sufficiently achieved as long as the profile of the line on the graph has no bending point within a range of the object heights at which the light available efficiency becomes 10% to 90% (the effective range of the object height). In other words, the lens array of Example 1 may have a configuration in which the profile of the line on the graph of the object height (position of the light-emitting point) with respect to the light available efficiency ratio has a bending point within a range of the object height in which the light available efficiency becomes 90% to 100% and 0% to 10%.

With the configuration described above, the advantages of this disclosure are achieved sufficiently by configuring the lens array so that the aperture surface of each of the imaging portions does not change with the object height within the effective range of the object height. Specifically, the respective imaging portions may be designed so that the optical flux from an object height at which the light available efficiency becomes 90% is restricted by each of the first and second aperture surfaces, and the optical flux from an object height at which the light available efficiency becomes 10% is restricted by at least one of the first and second aperture surfaces. Accordingly, the aperture surfaces may be made constant within the effective range of the object heights at which the light available efficiency becomes 10% to 90%.

In Example 1, the optical flux from the axial object height is restricted by the first and second aperture surfaces and the optical flux from the outermost object height is restricted by the first and second aperture surfaces in the respective imaging portions. In other words, since the aperture surfaces of the respective imaging portions are configured not to change with the object height within a range of the object height at which the light available efficiency becomes 0% to 100%, the aperture surfaces are also constant within the effective range of the object height.

As described thus far, the lens array of Example 1 has a configuration in which the aperture surfaces of the respective imaging portions do not change with the object height. In this configuration, an advantage that the unevenness of light amount distribution is prevented from being easily changed even when a change (deformation or change of refractive index) occurs in the respective imaging portions due to a temperature change are obtained.

Example 2

Subsequently, Example 2 of this disclosure will be described. The components same as or equivalent to Example 1 are denoted by the same reference signs, and the description thereof is simplified or omitted.

Figure 13A:
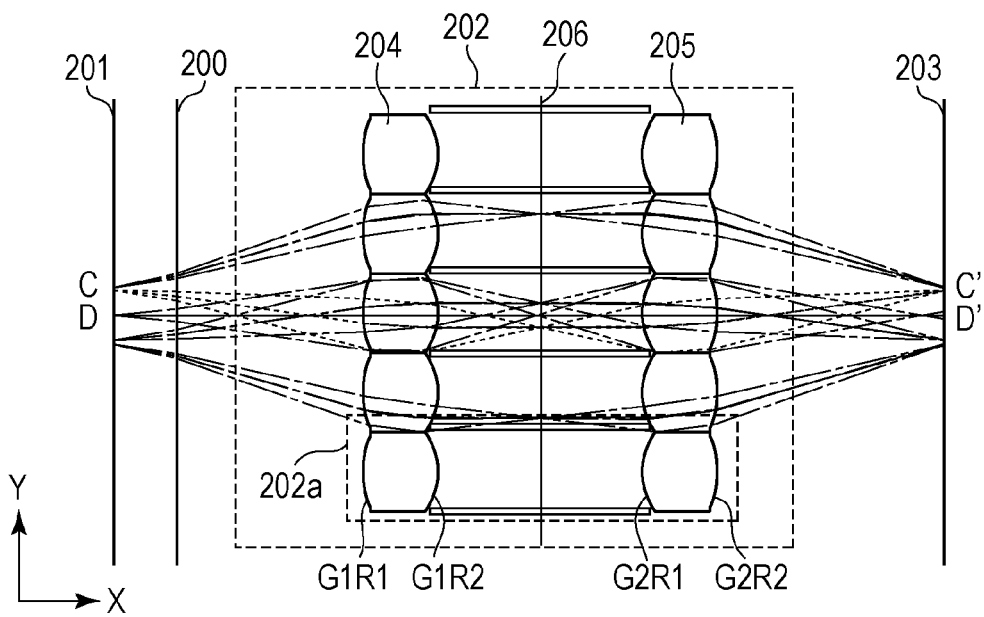
FIGS. 13A to 13C are schematic drawings of a principal portion of a lens array of Example 2.
Figure 13B:
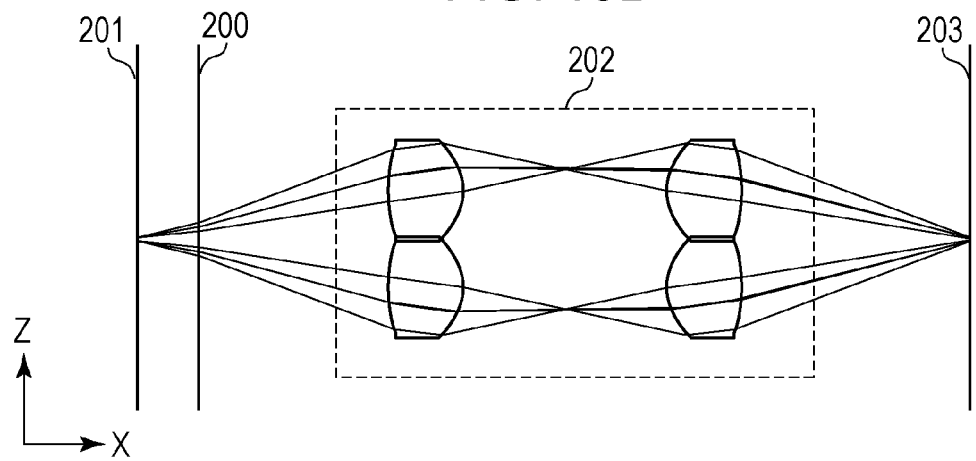
Figure 13C:
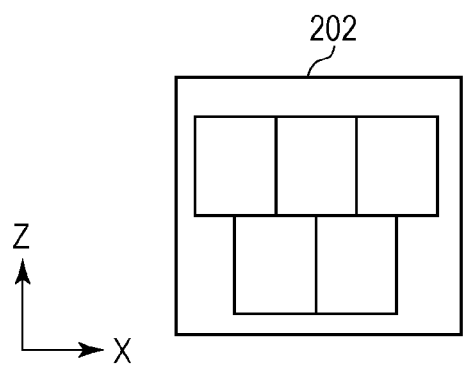

In Example 2, description will be given while imagining a case where a lens array is arranged in a reading unit of an image reading apparatus as illustrated in FIG. 1B. FIGS. 13A to 13C are schematic drawings illustrating a principal portion of a lens array 202 of Example 2, FIG. 13A illustrates the first cross section (XY cross section), FIG. 13B illustrates the second cross section (ZX cross section), and FIG. 13C illustrates a front view from the X direction. The lens array 202 of Example 2 includes two levels of a plurality of imaging portions 202a arrayed at a 0.65 mm arrangement period (pitch) in the first direction (Y direction) arrayed at 1.5 mm pitches in the second direction (Z direction). In this manner, by arraying the plurality of imaging portions 202a also in the second direction, improvement of the light available efficiency is achieved without increasing the effective diameter of the respective imaging portions 202a in the second direction in the extreme. For the sake of simplification, the imaging portions 202a on the lower row in the second direction are omitted in FIG. 13A.

The imaging portions 202a in the reading unit are each a system forming erecting same-magnification images of an original surface 201 on a sensor plane 203 of a sensor portion (erecting same-magnification imaging system) in the first cross section and the second cross section. In other words, the optical flux going out from the original surface 201 illuminated by an illuminating unit, not illustrated, passes through the lens array 202, and is condensed on one point on the sensor plane 203. For example, as illustrated in FIG. 13A, the optical flux from a position on the original C on the original surface 201 is converged at an imaging point C' on the sensor plane 203 and the optical flux from a position on the original D is converged on an imaging point D' on the sensor plane 203. In this configuration, reading corresponding to the original surface 201 is enabled. In a configuration of Example 2, an original is placed on an original table 200, which is a transparent member, and the original surface 201 is illuminated through the original table 200.

The imaging portions 202a which constitutes the lens array 202 will be described in detail.

As illustrated in FIG. 14, each of the imaging portions 202a of Example 2 includes a first optical system (G1 lens 204) and a second optical system (G2 lens 205) arranged on the same optical axis as in Example 1, and a light-shielding member 207. Here, an optical system which forms an intermediate image of the original surface 201 is defined as the first optical system and a plane on which the first optical system forms the intermediate image is defined as an intermediate imaging plane 206. An optical system configured to reform the intermediate image formed on the intermediate imaging plane 206 on the sensor plane 203 is defined as the second optical system.

Figure 15A:
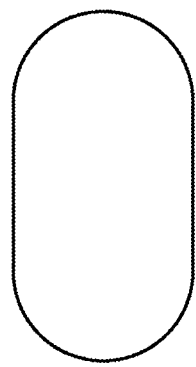
FIGS. 15A to 15C illustrate examples of rectangular aperture surfaces of the imaging portion of Example 2.
Figure 15B:
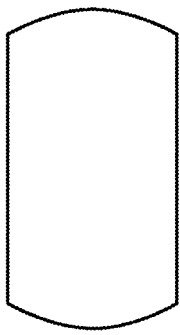
Figure 15C:
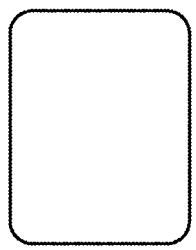

As illustrated in FIG. 14C, the shape of the aperture surfaces (lens surfaces) of the first optical system and the second optical system of Example 2 is a rectangular shape. Accordingly, the imaging portions 202a may be arranged in a zigzag shape as illustrated with minimum spaces therebetween. Accordingly, light available efficiency of the entire lens array 202 is improved. The term "rectangular" here means substantially rectangular and includes a rectangular shape having at least one of respective sides which constitute the rectangle curved, or a rectangular shape having no corners and formed into a substantially circular shape or a substantially oval shape. Specifically, for example, a track shape including a semicircular shape illustrated in FIG. 15A, a two-side truncated circular shape formed by truncating a circle by a straight line as illustrated in FIG. 15B, and a rounded rectangular shape having rounded corners as illustrated in FIG. 15C may be employed.

In addition, surfaces (G1R1 surface, G1R2 surface, G2R1 surface, and G2R2 surface) of lens surfaces of the G1 lens 204 and the G2 lens 205 of each of the imaging portions 202a which constitute the lens array 202 are anamorphic aspherical surfaces. Accordingly, improvement of imaging performance is achieved. In the imaging portions 202a, since a change in field angle in the second cross section is smaller than a change in field angle in the first cross section, the imaging performance in the second cross section can easily be secured in terms of design. Therefore, with a configuration in which the lens surfaces of the G1 lens 204 and the G2 lens 205 are formed to have a larger effective diameter in the second direction than that in the first direction, both of the imaging performance and the light available efficiency may simultaneously be realized. At this time, by equalizing the effective diameters of the respective lens surfaces of the G1 lens 204 and the G2 lens 205, a stress distortion can hardly occur when forming the lenses, and hence lens machining may be facilitated.

Here, defining that an intersection between the lens surface of the imaging portions 202a and an optical axis (X axis) is an origin point, and an axis orthogonal to the optical axis in the first direction is a Y-axis, and an axis orthogonal to the optical axis in the second direction is a Z-axis, the shape of the aspherical surface is expressed by an aspherical surface expression (2) given below.

[Expression 2]

$$x = \frac{\frac{y^2}{R_y} + \frac{z^2}{R_z}}{1 + \sqrt{1 - (1+k_y)\left(\frac{y^2}{R_y}\right)^2 - (1+k_z)\left(\frac{z^2}{R_z}\right)^2}} + \sum_{i=1}^{n} B_i\{(1-C_i)y^2 + (1+C_i)z^2\} \quad (2)$$

where, $R_y$ and $R_z$ are radii of curvature, $k_y$ and $k_z$ are constants of the cones, $B_i$ and $C_i$ (i=1, 2, 3, ...) are aspherical surface coefficients.

Various characteristic values of the imaging portions 202a of Example 2 will be shown in Table 3.

TABLE 3

| | | | | aspherical shape | | | |
|---|---|---|---|---|---|---|---|
| configuration | light source wavelength | 780 nm | | | | | |
| | G1 refractive index (light source wavelength) | 1.486 | | G1R1 | | G2R2 | |
| | G2 refractive index (light source wavelength) | 1.486 | | Ry | −0.3944 | Ry | 3.94E−01 |
| | intermediate imaging magnification β in first cross section | −0.50 | | ky | 1.1818 | ky | 1.18E+00 |
| | array pitch p in first direction | 0.65 mm | | Rz | −9.59E−01 | Rz | 9.59E−01 |
| | array pitch in second direction | 1.50 mm | | kz | −3.49E−01 | kz | −3.49E−01 |
| effective diameter | G1R1 (first direction) | 1.2 mm | | B1 | 7.48E−01 | B1 | −7.48E−01 |
| | G1R2 (first direction) | 1.2 mm | | C1 | −1.19E+00 | C1 | −1.19E+00 |
| | G2R1 (second direction) | 1.2 mm | | B2 | −1.18E−01 | B2 | 1.18E−01 |
| | G2R2 (first direction) | 1.2 mm | | C2 | −2.13E−01 | C2 | −2.13E−01 |
| | G1R1 (second direction) | 1.5 mm | | B3 | 2.71E−09 | B3 | −2.71E−09 |
| | G1R2 (second direction) | 1.5 mm | | C3 | −1.06E+02 | C3 | −1.06E+02 |
| | G2R1 (second direction) | 1.5 mm | | B4 | 7.66E−02 | B4 | −7.66E−02 |
| | G2R2 (second direction) | 1.5 mm | | C4 | −4.43E−02 | C4 | −4.43E−02 |
| arrangement | distance between object surface and back surface of original table | 1 mm | | G1R2 | | G2R1 | |
| | distance between back surface of original table and G1R1 | 2.963 mm | | Ry | −8.15E−01 | Ry | 8.15E−01 |
| | distance between G1R1 and G1R2 | 1.2 mm | | ky | −9.51E−01 | ky | −9.51E−01 |
| | distance between G1R2 and G2R1 | 3.224 mm | | Rz | −2.0586 | Rz | 2.06E+00 |
| | distance between G2R1 and G2R2 | 1.2 mm | | kz | −2.0012 | kz | −2.00E+00 |
| | distance between G2R2 and image surface | 3.6 mm | | B1 | 1.62E−02 | B1 | −1.62E−02 |
| | | | | C1 | −4.40E+00 | C1 | −4.40E+00 |
| | | | | B2 | −1.75E−01 | B2 | 1.75E−01 |
| | | | | C2 | 2.20E−02 | C2 | 2.20E−02 |
| | | | | B3 | 5.97E−02 | B3 | −5.97E−02 |
| | | | | C3 | 4.15E−01 | C3 | 4.15E−01 |

In Example 2, by designing the power and the lens diameter of the imaging portions 202a which constitute the lens array 202 adequately, a configuration in which the respective lens surfaces themselves correspond to the aperture surfaces, and the aperture surface on which the vignetting occurs in accordance with the object height does not change with the object height is achieved. Accordingly, the surfaces which restrict the optical fluxes are only the G1R2 surface (the first aperture surface) and the G2R1 surface (the second aperture surface), and hence the aperture surfaces of the imaging portions 202a may be made constant in all the object heights.

In Example 2, the lens surface (G1R2 surface) farthest from the original surface 201 (object surface) of the first optical system is defined as the first aperture surface. Here, in Example 2, since the first optical system and the second optical system are symmetric with respect to the intermediate imaging plane 206, the second aperture surface of the second optical system corresponds to a lens surface farthest from the image surface of the second optical system (G2R1 surface). In other words, in Example 2, a configuration in which the lens surface can be formed easily as the aperture surface is achieved by setting the first aperture surface and the second aperture surface to be the surfaces nearest to the intermediate imaging plane 206.

Figure 16A:
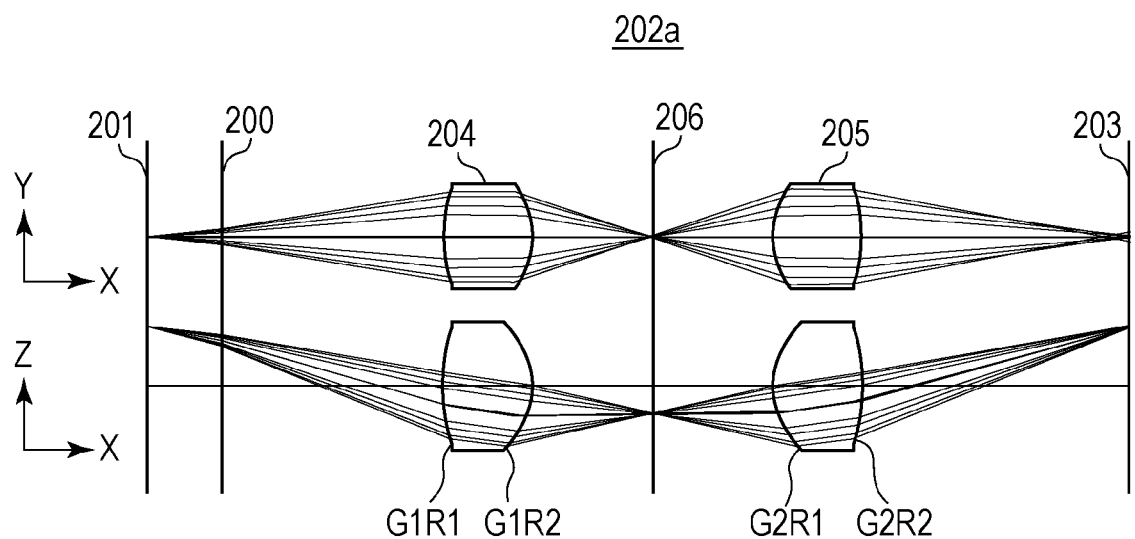
FIGS. 16A and 16B are drawings for explaining an axial aperture surface and an outermost aperture surface of Comparative Example 2.
Figure 16B:
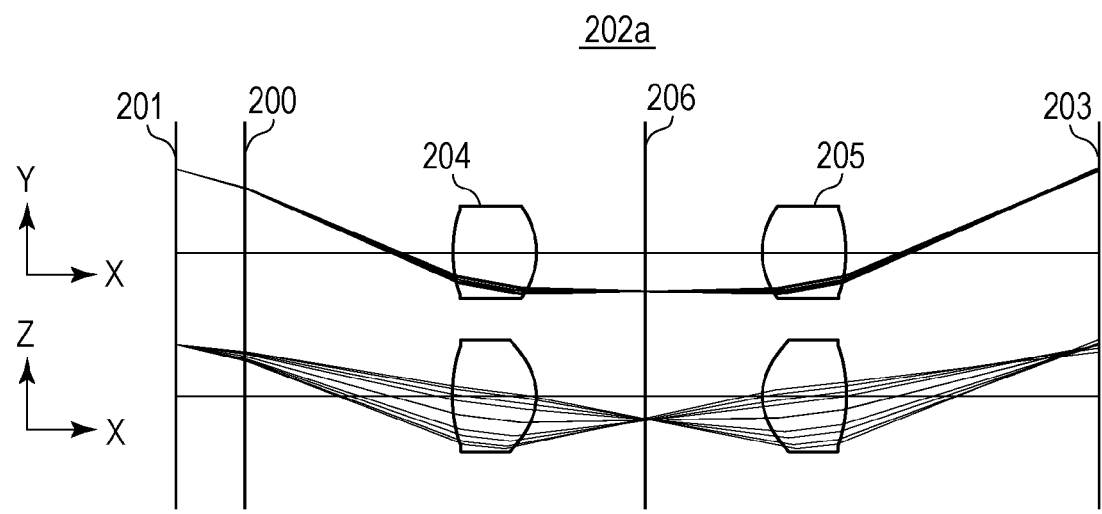

FIGS. 16A and 16B are drawings illustrating a state when the respective optical fluxes from the axial object height and the outermost object height pass through one of the imaging portions 202a which constitute the lens array 202 of Example 2. In Example 2, since a configuration in which the object (light source) and the optical axes of the respective imaging portions 202a are apart from each other in the second direction is employed, the optical flux from the axial object height and the optical fluxes on the optical axes are different.

In FIG. 16A, in both of the XY cross section and the ZY cross section, the axial aperture surface of the first optical system is the G1R2 surface (the light outgoing surface) and the axial aperture surface of the second optical system is the G2R1 surface (the light incident surface). In FIG. 16B, in both of the XY cross section and the ZY cross section, the outermost aperture surface of the first optical system is the G1R2 surface and the outermost aperture surface of the second optical system is the G2R1 surface. In this manner, the imaging portions 202a of Example 2 each have the axial aperture surface and the outermost aperture surface equal to each other in both of the first optical system and the second optical system, and hence the surface on which the vignetting occurs does not change with the object height.

Figure 17:
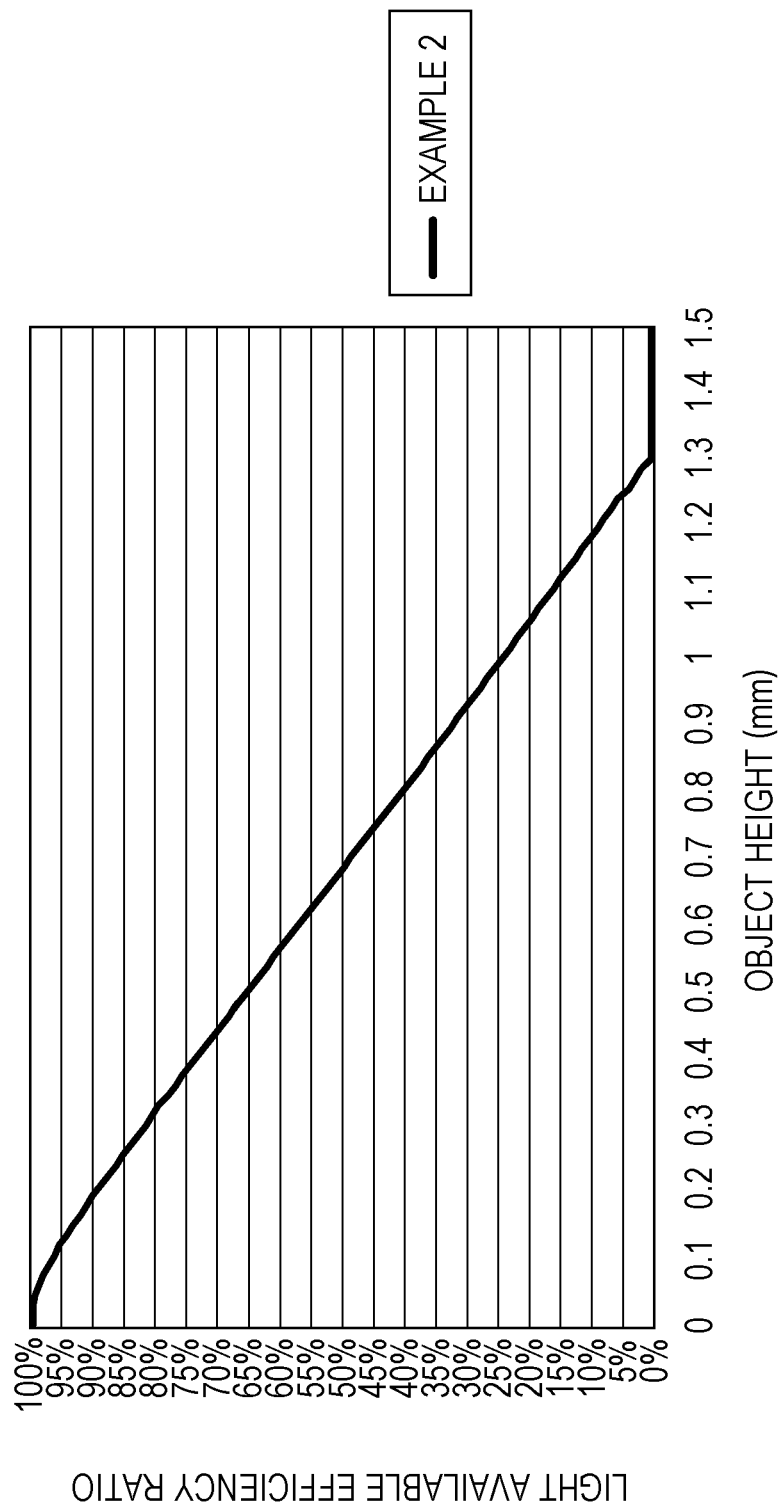
FIG. 17 is a graph of a relationship between the object height and the light available efficiency of the imaging portion, showing a relationship in Example 2.

In the same manner as Comparative Example 1, the light available efficiency ratio at each object height in one of the imaging portion of Example 2 is shown in FIG. 17. As is understood from FIG. 17, the profile of the line on the graph representing Example 2 does not have a bending point, and the inclination is still gentle without becoming steep. The light available efficiency ratio, the imaging light amount ratio, the received light amount ratio, and the corrected light amount ratio at every position on the original before the temperature change of Example 2 are illustrated in FIGS. 18A to 18D, respectively. It is understood from FIG. 18B that unevenness of the imaging light amount on the sensor plane develops depending on the position on the original on the original surface with the lens array integrated in the image reading apparatus as Example 2 as well.

Figure 18A:
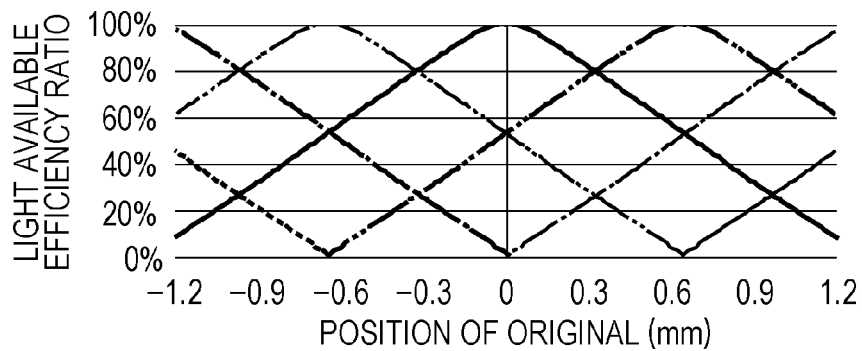
FIGS. 18A to 18D are drawings for explaining unevenness of light amount distribution occurring in Example 2 (before the temperature change).
Figure 18B:
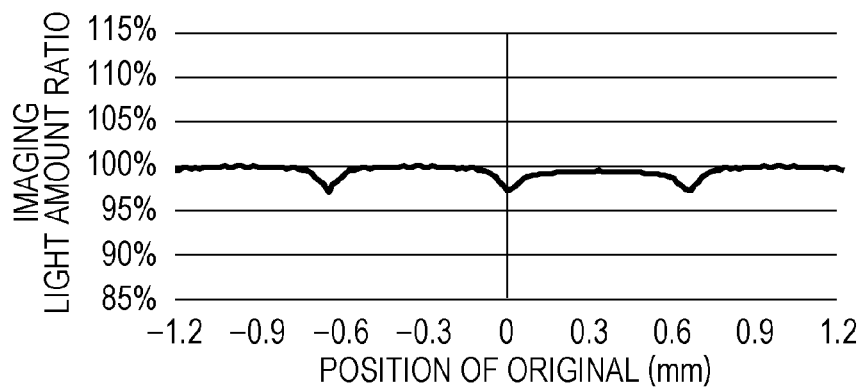
Figure 18C:
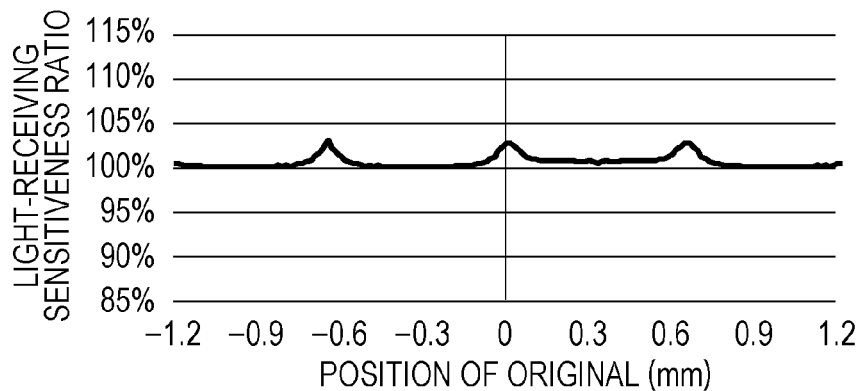
Figure 18D:
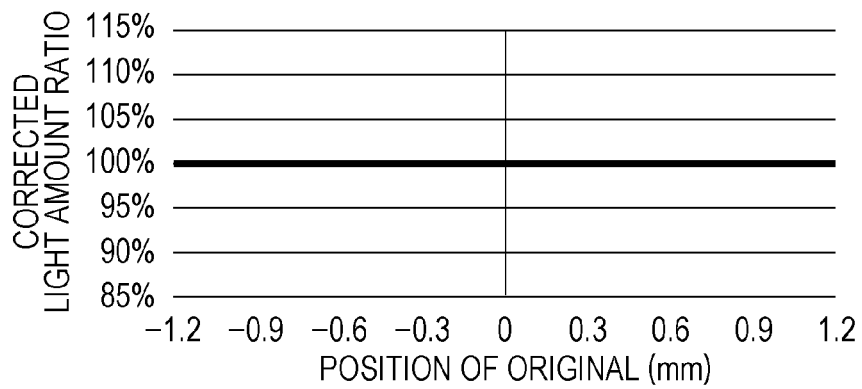

The unevenness of the imaging light amount is caused by a change of an optical path depending on the position on the original and difference of the light available efficiency from one position to another on the original in the lens array. In the image reading apparatus, the received light amount of the optical flux incident on the sensor plane may be uniformized by electrically correcting the light-receiving sensitiveness of the sensor portion in order to cope with the unevenness of the imaging light amount as illustrated in FIG. 18B. Specifically, the light-receiving sensitiveness ratio at a position on the sensor plane corresponding to the respective positions on the original is set as illustrated in FIG. 18C, so that the imaging light amount ratio (corrected light amount) after the correction of the light-receiving sensitiveness of the sensor portion becomes as illustrated in FIG. 18D, and the unevenness of the imaging light amount may be reduced.

Figure 19A:
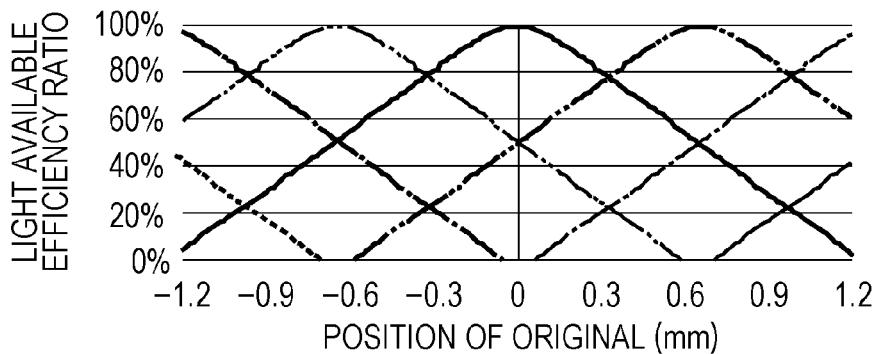
FIGS. 19A to 19D are drawings for explaining the unevenness of light amount distribution occurring in Example 2 (after the temperature change).
Figure 19B:
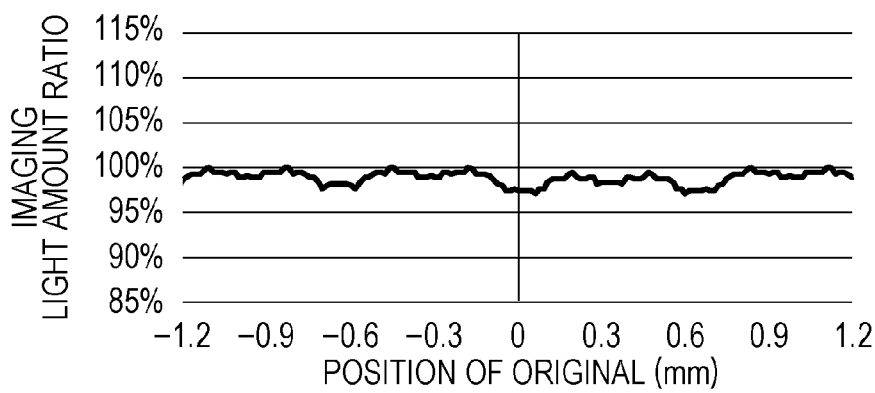
Figure 19C:
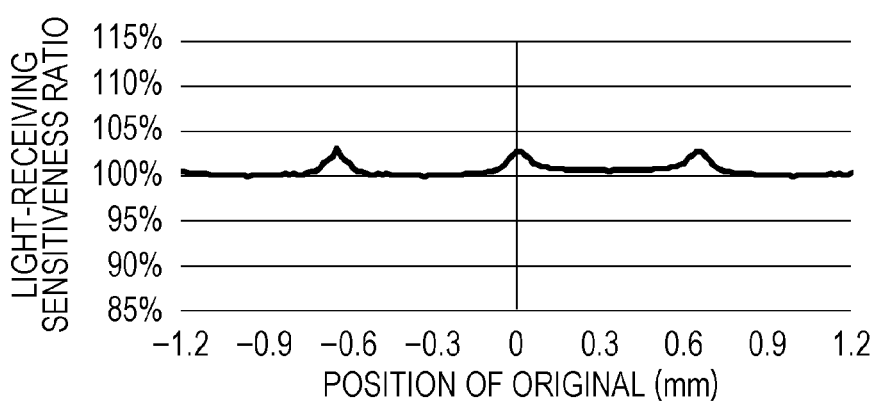
Figure 19D:
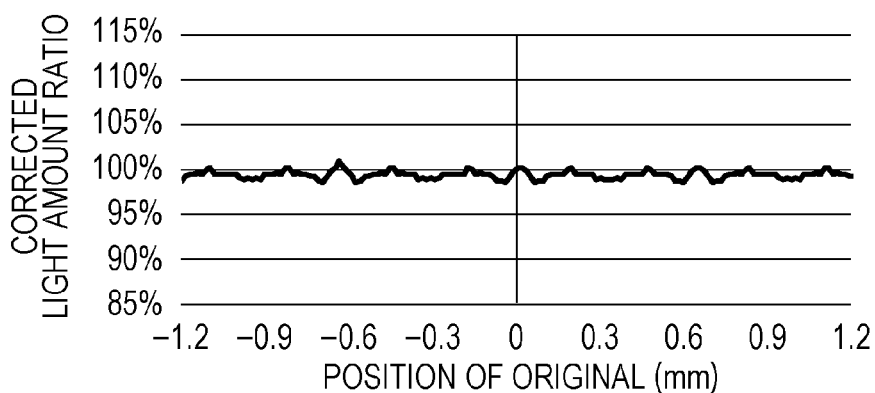

In addition, in the same manner as Example 1, a case where the distribution of the light available efficiency at each of the imaging portions varies due to a change in curvature of the respective imaging portions due to the temperature increase, and the outermost object height is decreased by 5% will be considered. The light available efficiency ratio, the imaging light amount ratio, the received light amount ratio, and the corrected light amount ratio at every position on the original at this time of Example 2 are illustrated in FIGS. 19A to 19D respectively. In Example 1 as well, unevenness of light amount distribution of p-p 2% shows up as illustrated in FIG. 19D with respect to the corrected light amount ratio before occurrence of the temperature increase illustrated in FIG. 18D due to a change of the imaging portion caused by the temperature increase. However, the unevenness of the light amount distribution shows a significantly small value in comparison with Comparative Example 1 (p-p 17%). In addition, in Example 2, the number of optical fluxes which contribute to the image formation may be increased with a configuration of the lens array including the two levels of arrays of the imaging portions, so that the development of the unevenness of light amount distribution can be suppressed more than Example 1 (p-p 5%).

As described thus far, the lens array of Example 2 has a configuration in which the aperture surfaces of the respective imaging portions do not change with the object height. In this configuration, an advantage that the unevenness of light amount distribution is prevented from being easily changed even when a change (deformation or change of refractive index) occurs in the respective imaging portions due to a temperature change are obtained.

Example 3

Subsequently, Example 3 of this disclosure will be described. The components same as or equivalent to Example 1 are denoted by the same reference signs, and the description thereof is simplified or omitted.

Figure 20A:
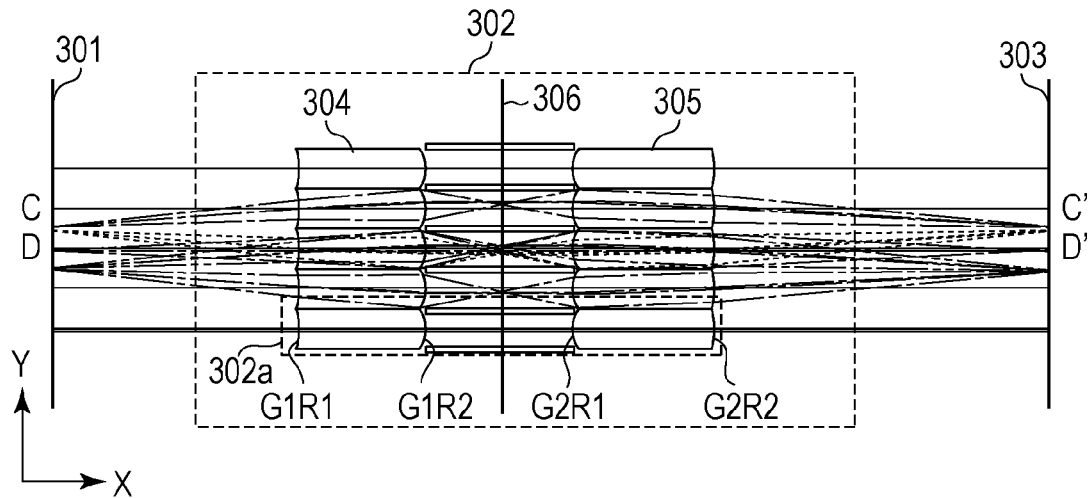
FIGS. 20A to 20C are schematic drawing of a principal portion of a lens array of Example 3.
Figure 20B:
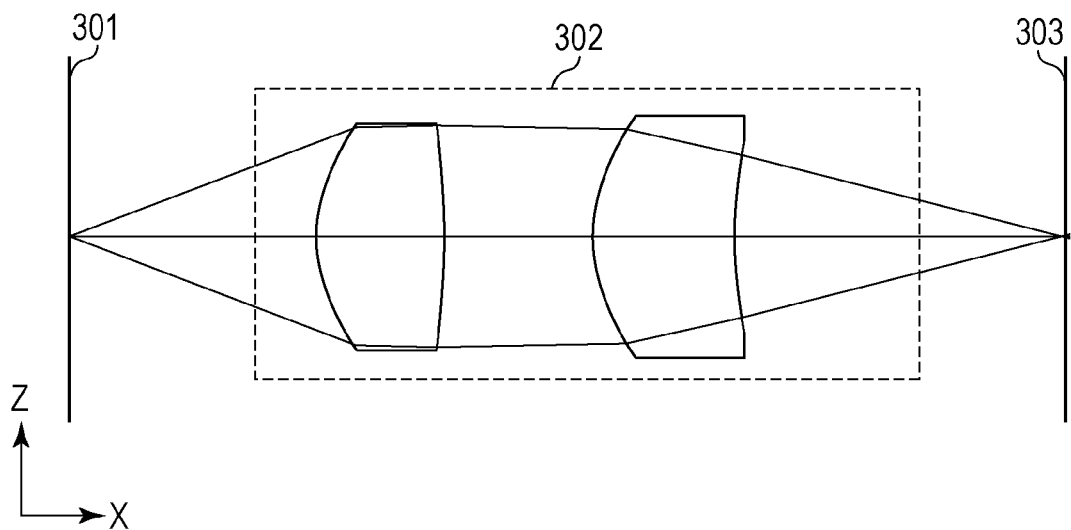
Figure 20C:
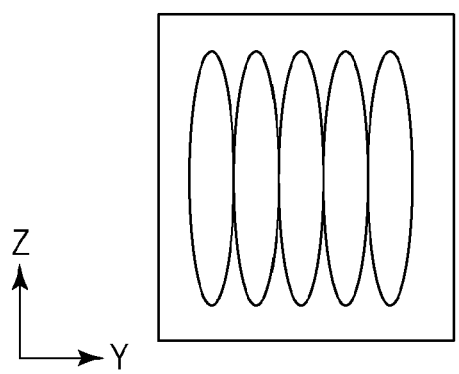

In Example 3 as well, description will be given while imaging a case where a lens array is arranged in an exposure unit of the imaging apparatus as illustrated in FIG. 1A in the same manner as Example 1. FIGS. 20A to 20C illustrate schematic drawings of a principal portion of a lens array 302 of Example 3, FIG. 20A illustrates a first cross section (XY cross section), FIG. 20B illustrates a second cross section (ZX cross section), and FIG. 20C illustrates a front view from the X direction. The lens array 302 of Example 3 includes a plurality of imaging portions 302a arrayed at 0.30 mm array pitches in the first direction (direction Y). In the second direction (Z direction), the imaging portions 302a are arrayed in one level.

As illustrated in FIG. 21, each of the imaging portions 302a includes a first optical system (G1 lens 304) a second optical system (G2 lens 305), and a light-shielding member 307. The imaging portions 302a are each a system forming erecting same-magnification images of the plurality of light-emitting points of the light source 101 on the photosensitive surface 103 of the photosensitive member (erecting same-magnification imaging system) in the XY cross section. However, unlike Example 1, the imaging portions 302a are each a system forming erecting same-magnification images of a plurality of light-emitting points of a light source 101 on a photosensitive surface 103 of the photosensitive member (inverting same-magnification imaging system) in the ZX cross section. Accordingly, improvement of the imaging performance is achieved in comparison with the erecting same-magnification imaging system. In the ZX cross section, the G1 lens 304 and the G2 lens 305 have an asymmetrical shape with respect to an intermediate imaging plane 306.

As illustrated in FIG. 20C, the shape of the aperture surfaces (lens surfaces) of the first optical system and the second optical system of Example 2 is an oval shape. Accordingly, the improvement of the light available efficiency is achieved by enlarging the aperture while improving the imaging performance by restricting the angle field. The lens surfaces (G1R1 surface, G1R2 surface, G2R1 surface, and G2R2 surface) of the respective imaging portions 302a which constitute the lens array 302 are formed into an anamorphic aspherical surface, and the shape of the aspherical surface is expressed by an aspheric surface expression (2) in the same manner as Example 2. Various characteristic values of the imaging portions 302a of Example 3 will be shown in Table 4.

Figure 22A:
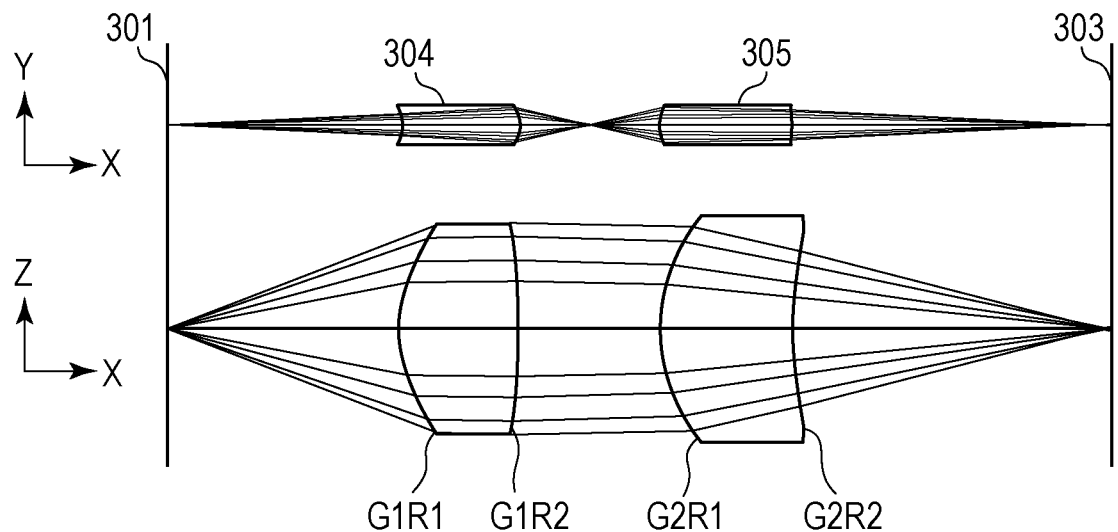
FIGS. 22A and 22B are drawings for explaining an axial aperture surface and an outermost aperture surface of Example 3.
Figure 22B:
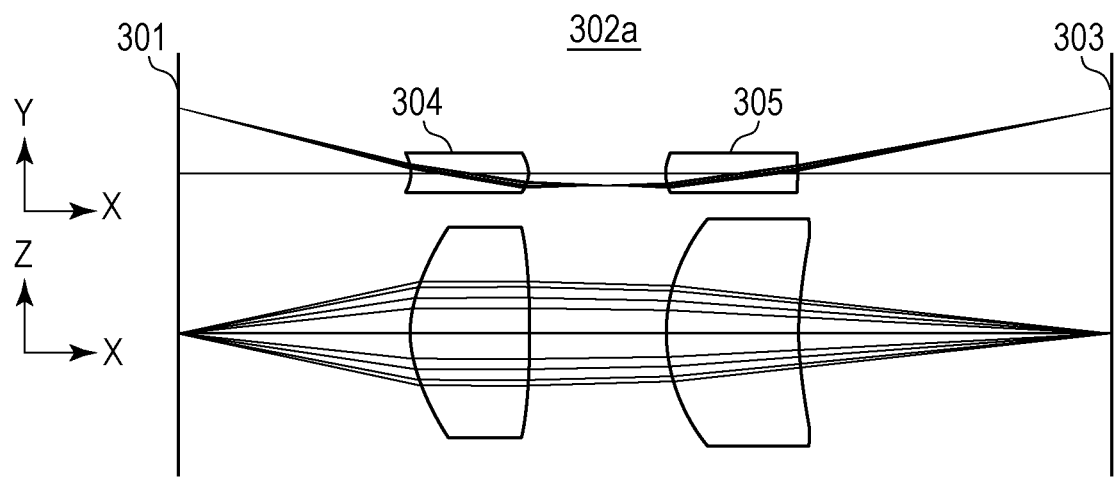
Figure 24A:
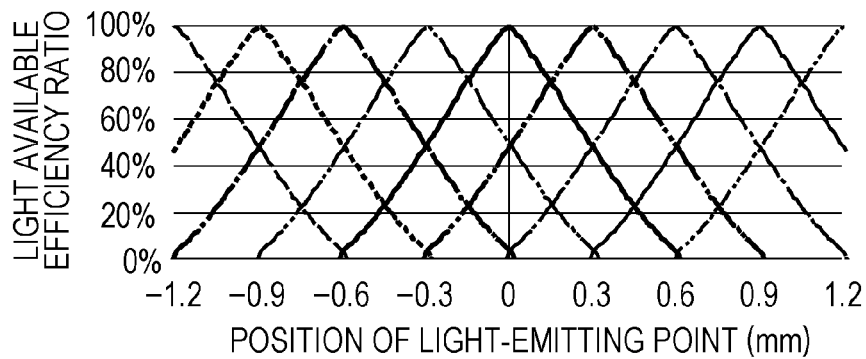
FIGS. 24A to 24D are drawings for explaining the unevenness of light amount distribution occurring in Example 3 (before the temperature change).
Figure 24B:
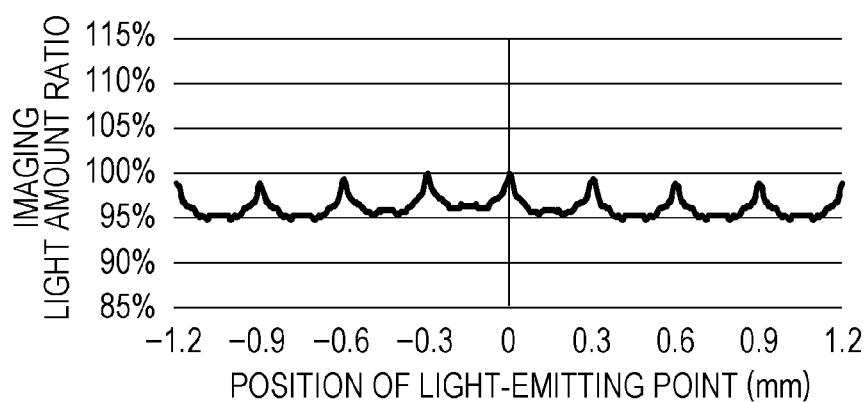
Figure 24C:
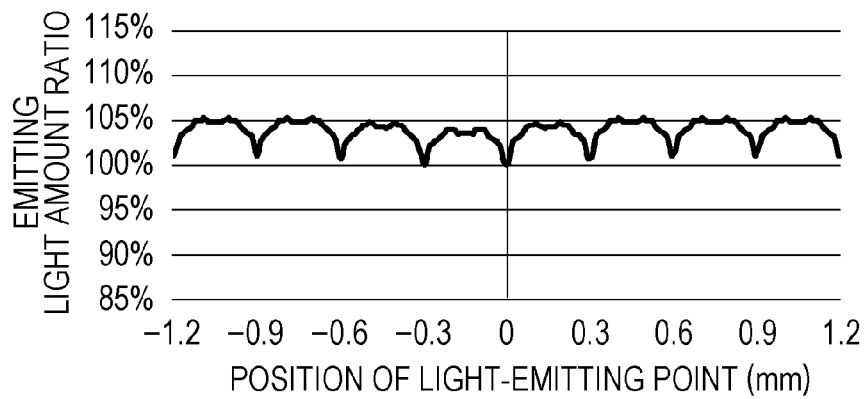
Figure 24D:
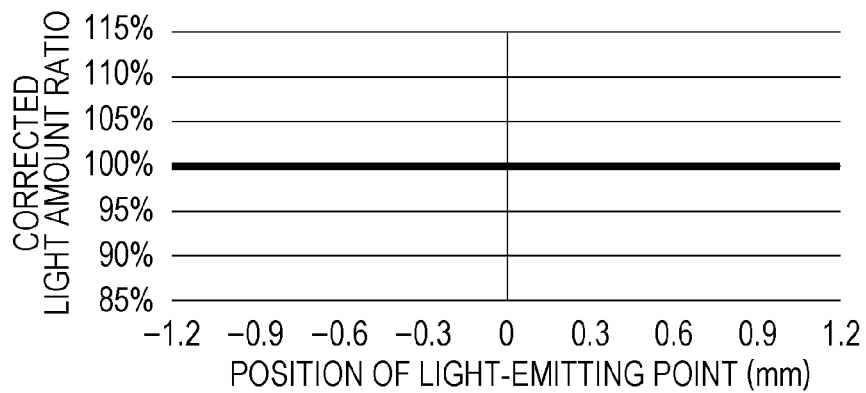

FIGS. 22A and 22B are drawings illustrating a state when the respective optical fluxes from the axial object height and the outermost object height pass through one of the imaging portions 302a which constitute the lens array 302 of Example 3. In FIG. 22A, in the XY cross section, the axial aperture surface of the first optical system is the G1R2 surface (the light outgoing surface) and the axial aperture surface of the second optical system is the G2R1 surface (the light incident surface). Since the aperture surfaces (the G1R2 surface and the G2R1 surface) of Example 3 both have an oval shape, although being difficult to see in the drawing, the axial aperture surface of the first optical system is the G1R2 surface and the axial aperture surface of the second optical system is the G2R1 surface even in the ZX cross section. In FIG. 22B, in both of the XY cross section and the ZY cross section, the outermost aperture surface of the first optical system is the G1R2 surface and the outermost aperture surface of the second optical system is the G2R1 surface.

In this manner, the imaging portions 302a of Example 3 each have the axial aperture surface and the outermost aperture surface equal to each other in both of the first optical system and the second optical system, and hence the surface on which the vignetting occurs does not change with the object height.

In the same manner as Comparative Example 1, the light available efficiency ratio at each object height in one of the imaging portions of Example 3 is shown in FIG. 23. As is

TABLE 4

| configuration | light source wavelength | 780 nm | aspherical shape | | | |
|---|---|---|---|---|---|---|
| | G1 refractive index (light source wavelength) | 1.486 | | G1R1 | | G2R2 |
| | G2 refractive index (light source wavelength) | 1.486 | Ry | −0.5576 | Ry | 5.49E−01 |
| | paraxial imaging magnification β1 in primary array direction in first optical system | −0.23 | ky | 3.7469 | ky | −2.01E+01 |
| | pitch in primary array direction | 0.30 mm | Rz | −9.61E−01 | Rz | −4.86E+00 |
| effective diameter | G1R1 primary array direction | 0.5 mm | kz | −8.09E+00 | kz | 8.00E+01 |
| | G1R2 primary array direction | 0.5 mm | B1 | 4.81E−01 | B1 | −5.67E−01 |
| | G2R1 primary array direction | 0.5 mm | C1 | −6.93E−01 | C1 | −1.24E+00 |
| | G2R2 primary array direction | 0.5 mm | B2 | −4.54E−01 | B2 | 1.10E+00 |
| | G1R1 secondary array direction | 3 mm | C2 | −8.91E−01 | C2 | −1.03E+00 |
| | G1R2 secondary array direction | 3 mm | B3 | 6.68E−01 | B3 | −1.72E−02 |
| | G2R1 secondary array direction | 3 mm | C3 | −1.57E+00 | C3 | −2.03E−01 |
| | G2R2 secondary array direction | 3 mm | B4 | −7.65E+01 | B4 | 8.50E+00 |
| arrangement | distance between object surface and G1R1 | 3.3 mm | C4 | −1.00E+00 | C4 | −1.00E+00 |
| | distance between G1R1 and G1R2 | 1.7 mm | | G1R2 | | G2R1 |
| | distance between G1R2 and G2R1 | 1.956 mm | Ry | −8.24E−01 | Ry | 1.72E+00 |
| | distance between G2R1 and G2R2 | 1.885 mm | ky | −7.96E+00 | ky | 2.44E+00 |
| | distance between G2R2 and image surface | 4.498 mm | Rz | −2.0606 | Rz | −4.92E+00 |
| | | | kz | −46.0884 | kz | −2.99E−01 |
| | | | B1 | −3.05E−01 | B1 | 3.70E−01 |
| | | | C1 | −1.00E+00 | C1 | −1.00E+00 |
| | | | B2 | −9.66E−02 | B2 | −1.24E−03 |
| | | | C2 | −1.00E+00 | C2 | −1.00E+00 |
| | | | B3 | −7.07E−02 | B3 | 3.73E−02 |
| | | | C3 | −1.00E+00 | C3 | −1.00E+00 |

Figure 25A:
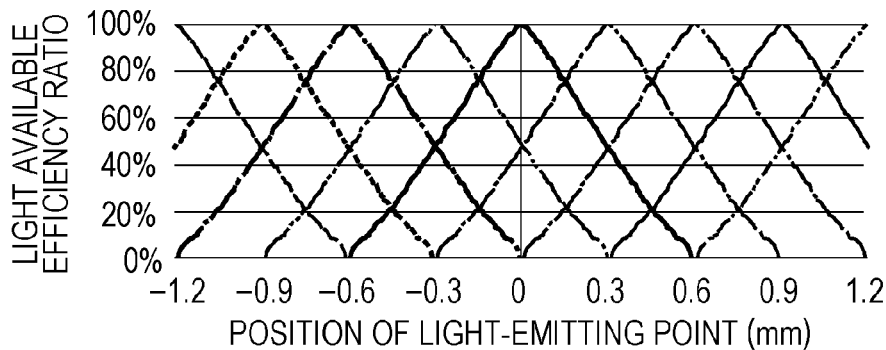
FIGS. 25A to 25D are drawings for explaining unevenness of light amount distribution occurring in Example 3 (after the temperature change).
Figure 25B:
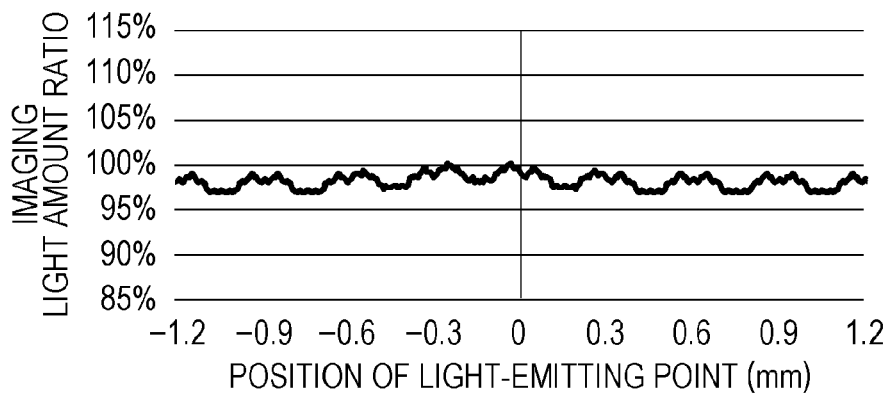
Figure 25C:
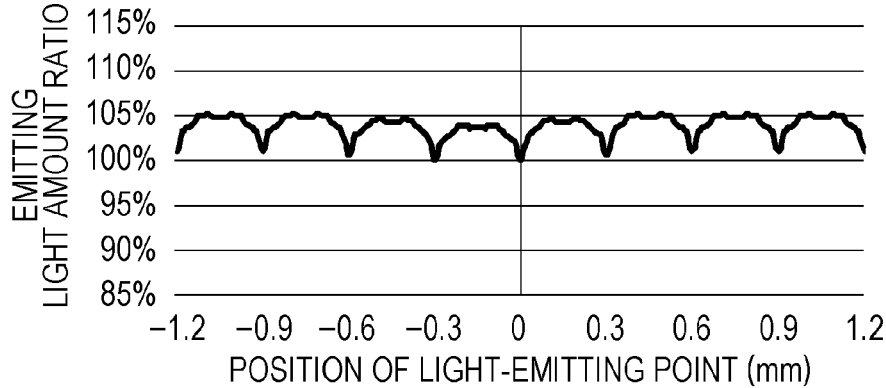
Figure 25D:
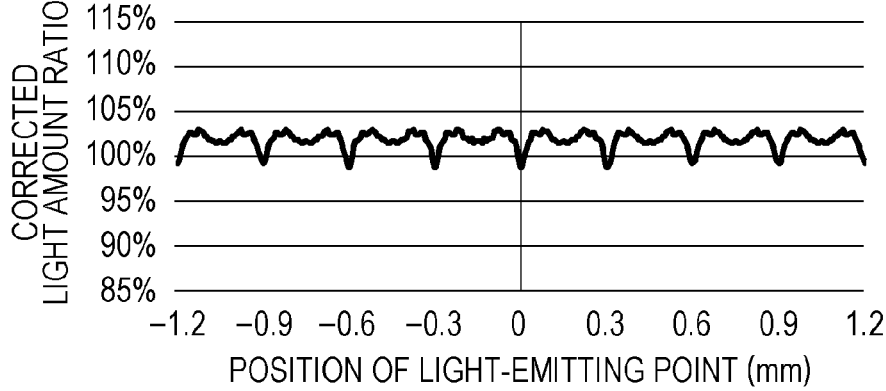

In Example 3 as well, by designing the power and the lens diameter of the imaging portions 302a which constitute the lens array 302 adequately, a configuration in which the respective lens surfaces themselves correspond to the aperture surfaces, and the aperture surface on which the vignetting occurs in accordance with the object height does not change with the object height is achieved. Accordingly, the surfaces which restrict the optical fluxes are only the G1R2 surface (the first aperture surface) and the G2R1 surface (the second aperture surface), and hence the aperture surfaces of the imaging portions 302a may be made constant in all the object heights.

understood from FIG. 23, the profile of the line on the graph representing Example 3 does not have a bending point, and the inclination of the line on the graph is gentler than that of Comparative Example 1. In addition, the light available efficiency ratio, the imaging light amount ratio, the emitting light amount ratio, and the corrected light amount ratio at every position of light-emitting point of Example 3 are illustrated in FIGS. 24A to 24D (before the temperature increase) and FIG. 25A to 25D (after the temperature increase), respectively. In Example 3 as well, unevenness of light amount distribution of p-p 5% shows up as illustrated in FIG. 25D with respect to the corrected light amount ratio before occurrence of the temperature increase illustrated in FIG. 24D due to a change of the imaging portion caused by the temperature increase. However, the unevenness of the light amount distribution is significantly small in comparison with Comparative Example 1 (p-p 17%).

As described thus far, the lens array of Example 3 has a configuration in which the aperture surfaces of the respective imaging portions do not change with the object height. In this configuration, an advantage that the unevenness of light amount distribution is prevented from being easily changed even when a change (deformation or change of refractive index) occurs in the respective imaging portions due to a temperature change may be obtained.

Example 4

Subsequently, Example 4 of this disclosure will be described. The components same as or equivalent to Example 1 are denoted by the same reference signs, and the description thereof is simplified or omitted. Example 4 is different from Example 1 only in the array pitch of the respective imaging portions which constitute the lens array in the first direction.

Figure 26A:
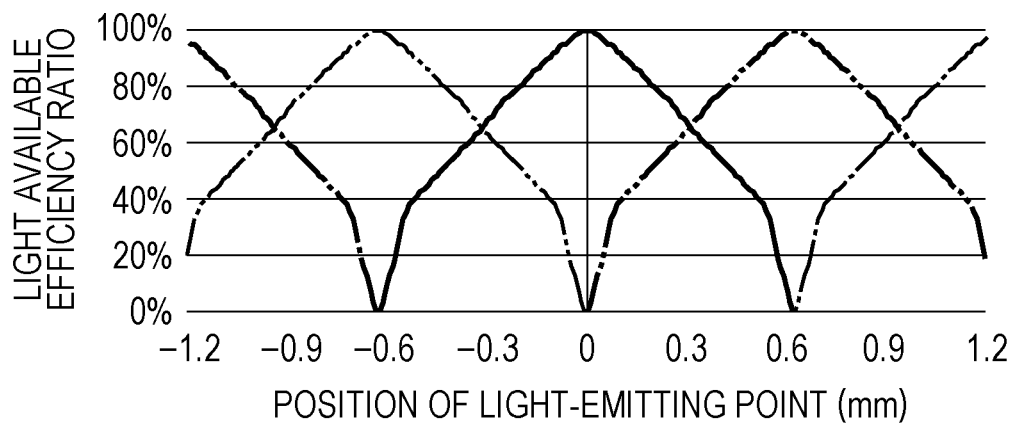
FIGS. 26A and 26B are drawings for explaining unevenness of light amount distribution occurring in Comparative Example 2.

As described above, since the unevenness of the light amount distribution develops depending on a change of the degree of overlapping of the lines on the graph in the vicinity of the outermost object height, the unevenness of light amount distribution may be reduced by changing the array pitch of the respective imaging portions. Here, a configuration in which the array pitch of the imaging portions which constitute the lens array in the first direction according to Comparative Example 1 described above is 0.59 mm is designated as Comparative Example 2, and the light available efficiency ratio at every position of light-emitting points of Comparative Example 2 is shown in FIG. 26A. As is understood from FIG. 26A, the overlap of the lines on the graph in the vicinity of the outermost object height is adequately corrected by adjustment of the array pitch.

Figure 26B:
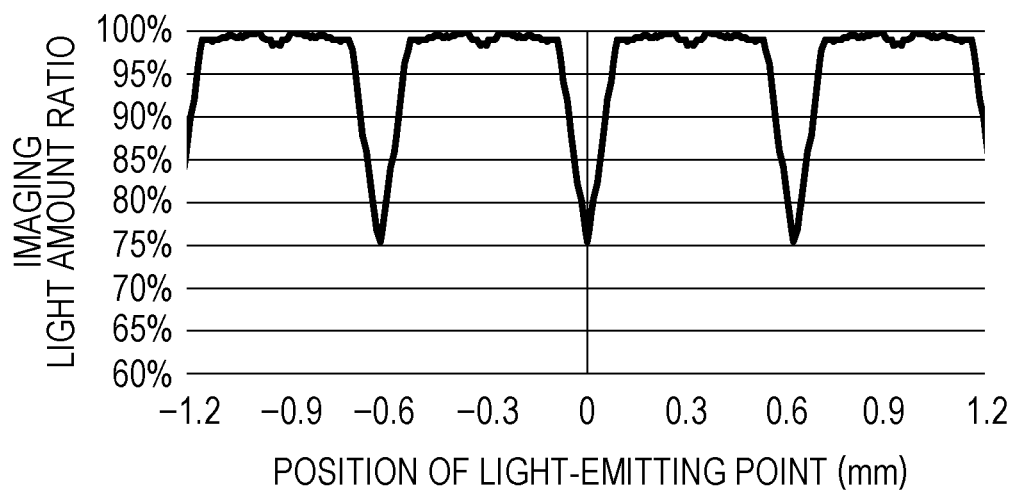

However, as will be understood when illustrating the imaging light amount ratio at every position of the light-emitting points in Comparative Example 2 in FIG. 26B, p-p 25.0% of the unevenness of light amount distribution shows up irrespective of the adjustment of the array pitch of the imaging portions. It is because when the graph includes the bending point, reduction efficiency against the unevenness of light amount distribution varies depending on the profile as described above. Therefore, in this method, the imaging portions having high reduction efficiency against the unevenness of light amount distribution cannot be designed and manufactured sable.

Figure 27A:
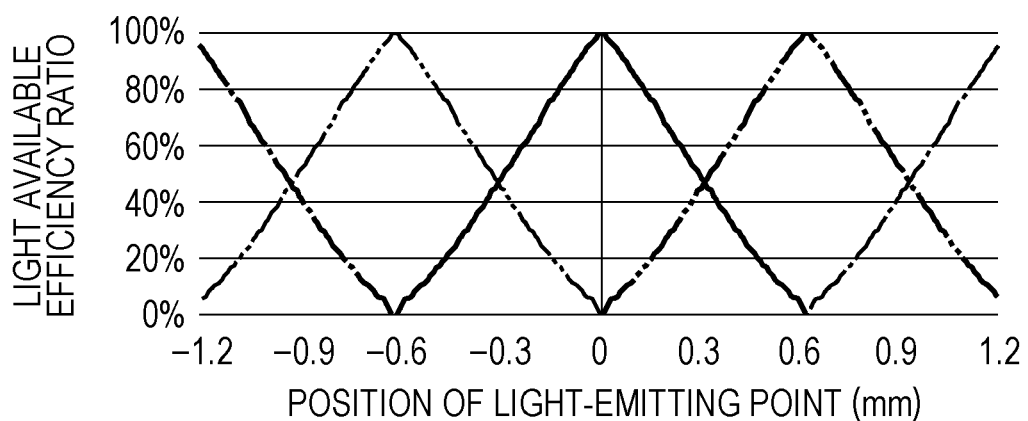
FIGS. 27A and 27B are drawings for explaining unevenness of light amount distribution occurring in Example 4.
Figure 27B:
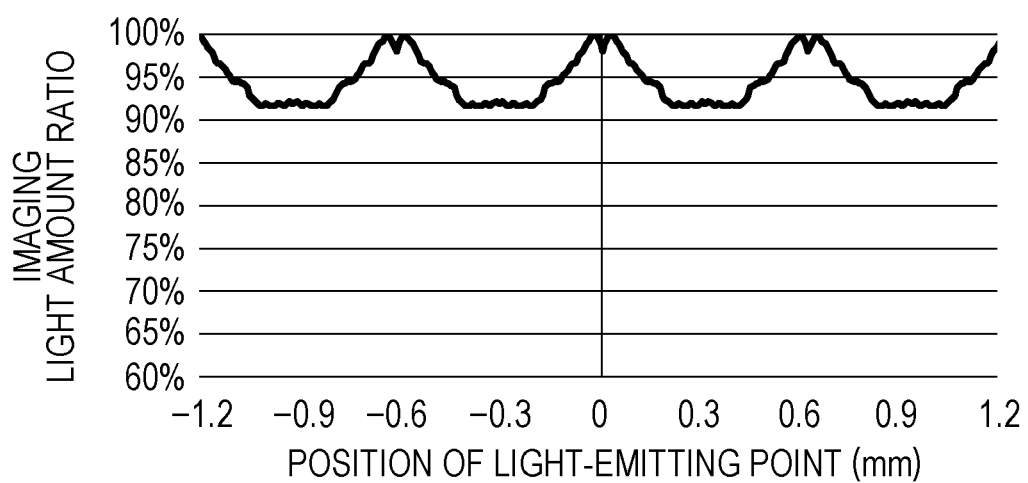

Therefore, in Example 4, on the basis of the configuration in which the aperture surface does not change with the object height like Example 1, the lens array is designed so that the outermost object heights with respect to the respective imaging portions becomes substantially equal to the array pitch of the imaging portions. Specifically, on the basis of the effective diameters of the respective lens surfaces designed so that the surfaces which restrict the optical fluxes are only the G1R1 surface (the first aperture surface) and the G2R2 surface (the second aperture surface), the array pitch of the imaging portions is defined as 0.62 mm. Accordingly, as illustrated in FIG. 27A, the graph of the position of the light-emitting point with respect to the light available efficiency ratio does not have any bending point, and has a profile in which the overlap in the vicinity of the outermost object height is desirably corrected. The imaging light amount ratio for each of the positions of the light-emitting points of Example 4 is as illustrated in FIG. 27B, in which p-p 8.2% of the unevenness of light amount distribution shows up. However, it is understood that the unevenness of light amount distribution can be reduced with respect to Comparative Example 2.

In this manner, the unevenness of light amount distribution may be desirably reduced by substantially matching the graphs of the object height with respect to the light available efficiency ratio in the vicinity of the outermost object heights of the respective imaging portions. The outermost object height and the array pitch do not have to match strictly, and an advantage of reducing the unevenness of light amount distribution may be obtained also in a case where the outermost object height is integral multiple of the array pitch or a case where the outermost object height is shifted by ±10% of the array pitch. In the configuration described above, the advantage of reducing the unevenness of light amount distribution desirably may be obtained by designing an array pitch p of the respective imaging portions and an outermost object height L so as to satisfy the following conditional expression (3), where n is positive integer.

$$(n-0.1)\times p \leq L \leq (n+0.1)\times p \quad (3)$$

Imaging Apparatus

FIG. 1A is a schematic drawing (cross-sectional view taken along a ZX plane) of a principal portion of the color imaging apparatus 33 according to the embodiment of this disclosure. The color imaging apparatus 33 is a color imaging apparatus of a tandem type in which four optical apparatuses (exposure units) having any one of the lens arrays described in the examples described above and arranged in parallel to each other are provided configured to expose the light-receiving surface (photosensitive surface) of the photosensitive drum (photosensitive member). The color imaging apparatus 33 includes exposure units 17, 18, 19, and 20 having any configuration described in the respective examples, photosensitive drums 21, 22, 23, and 24, which correspond to image bearing members, developing devices 25, 26, 27, and 28, a conveyance belt 34, and a fixing device 37. Here, the exposure units 17, 18, 19, and 20 are arranged so that the second direction of the lens array matches a secondary scanning direction (Z direction), which is the direction of rotation of the photosensitive drums 21, 22, 23, and 24.

In FIG. 1A, color signals of R (red), G (green), and B (blue) are input from an external device 35 such as a personal computer to the color imaging apparatus 33. These color signals are converted into image signals (dot data) of C (cyan), M (magenta), Y (yellow), and B (black) by a printer controller 36 in the apparatus, and the respective image signals are input to the exposure units 17, 18, 19, and 20. The printer controller 36 performs not only the conversion of the signal, but also control of the respective portions of the color imaging apparatus 33.

The exposure units 17, 18, 19, and 20 emit exposure lights 29, 30, 31, and 32 modulated on the basis of the image signals of the respective colors. Respective photosensitive surfaces of the photosensitive drums 21, 22, 23, and 24 charged by charging rollers, not illustrated, are exposed by the exposure lights 29, 30, 31, and 32, respectively, and hence electrostatic latent images are formed on the respective photosensitive surfaces. Subsequently, electrostatic latent images of the respective colors formed on the photosensitive surfaces of the photosensitive drums 21, 22, 23, and 24 are developed by the developing units 25, 26, 27, and 28, respectively, into toner images of respective colors. The toner images of the respective colors are transferred to a recording material by a transfer device, not illustrated, in an overlapped manner, and then are fixed by the fixing device 37, so that one full color image is formed.

Image Reading Apparatus

FIG. 1B is a schematic drawing (cross-sectional view taken along a ZX plane) of a principal portion of the image reading apparatus 44 according to an embodiment of this disclosure. The image reading apparatus 44 has a configuration in which an original 40 arranged on an upper surface of an original table 43 formed of a transparent member by the reading unit 41. The original table 43 is supported by a frame 42, and the upper surface of the original table 43 matches the original surface of the original 40.

Here, the reading unit 41 includes an illuminating unit configured to illuminate the original 40 through the original table 43, any one of the lens arrays described in the respective examples above, and a light-receiving portion configured to receive reflective light from the original 40 condensed by the lens array. The reading unit 41 has a configuration movable in the direction X (secondary scanning direction) by a drive unit, not illustrated, so that the relative position between the original 40 and the lens array may be changed in the secondary scanning direction. In this configuration, the reading unit 41 is capable of reading the original surface of the original 40 in sequence in the secondary scanning direction, so that image data of an entire area of the original surface of the original 40 may be acquired.

At this time, the upper surface of the original table 43, that is, the original surface of the original 40 is arranged on the object surface of the lens array, and the light-receiving surface (sensor plane) of the light-receiving unit is arranged on the image surface of the lens array. The lens array is arranged so that the second direction matches the secondary scanning direction. Examples of the light-receiving units include a line sensor composed of a CCD sensor or a CMOS sensor. The image reading apparatus 44 may have a configuration in which transmissive light from the original 40 illuminated by the illuminating unit is received by the light receiving unit. The illuminating unit is not limited to the configuration including the light source, but may have a configuration in which the light from the outside is guided onto the original 40.

Modification

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, in the respective examples described above, the lens surfaces themselves of the first optical system and the second optical system are aperture surfaces. However, this disclosure is not limited thereto, and the aperture surfaces may be formed by aperture stops provided separately in the respective optical systems. In this case, a configuration in which the optical flux is restricted by a combination of the lens surface and the aperture stop.

The imaging portions of Examples 1 and 2 each have a shape symmetrical with respect to the intermediate imaging surface thereof. However, the imaging portions may have a shape asymmetrical with respect to the intermediate imaging surface as Example 3. Although the imaging portions of the respective examples are each the system for erecting same-magnification images of an object in the first cross section, the erecting imaging system does not have to be strictly the same-magnification as long as the advantages of this disclosure are obtained. In contrast, in the second cross section, the imaging portions may have an enlargement system or the magnification of the imaging portions may be varied for correcting an aberration or reducing sensitivity. Therefore, the imaging portions of Example 2 do not have to be the inverting same-magnification imaging system as long as it is of the inverting imaging system in the second cross section.

In the respective examples described above, the optical flux from the axial object height (or the object height at which the light available efficiency becomes 90%) is restricted by both the first aperture surface of the first optical system and the second aperture surface of the second optical system. In addition, the optical flux from the outermost object height (or the object height at which the light available efficiency becomes 10%) is restricted by both the first aperture surface of the first optical system and the second aperture surface of the second optical system.

However, this disclosure is not limited thereto, and a configuration in which the optical flux from the axial object height (or the object height at which the light available efficiency becomes 90%) is restricted by only one of the first aperture surface and the second aperture surface may be employed. For example, in a case where the optical flux from the axial object height is restricted only by the first aperture surface, the optical flux from the outermost object height may be restricted by the first aperture surface. In the same manner, in a case where the optical flux from the axial object height is restricted only by the second aperture surface, the optical flux from the outermost object height may be restricted by the second aperture surface. In the lens array of the embodiment disclosed here, a configuration in which the optical flux from the outermost object height is restricted by the second aperture surface in a case where the optical flux from the axial object height is restricted only by the first aperture surface is not possible.

Therefore, a configuration in which the optical flux from the object height at which the light available efficiency becomes 90% is restricted by at least one of the first aperture surface and the second aperture surface, and the optical flux from the object height at which the light available efficiency becomes 10% is restricted by the aperture surface which restricts the optical flux from the object height at which the light available efficiency becomes 90% may be employed. In this configuration, a configuration in which the aperture surface does not change with the object height is achieved, and the advantages of this disclosure may be obtained.

The lens arrays of the respective examples may be configured in such a manner that the effective diameters of the aperture surfaces of the first optical system and the second optical system in the first direction are different. In such a configuration, there may be a case where a range of the object height in which only one of the aperture surfaces of the first and second optical systems restricts the optical flux from the axial object height. However, in such a case as well, the advantages of this disclosure may be obtained employing a configuration in which the aperture surface does not change with the object height.

Furthermore in Example 2, the above described advantages are achieved by a configuration in which at least one of the lens surfaces of the first optical system and the second optical system is configured to have a larger effective diameter in the second direction than the effective diameter in the first direction.

In addition, the image reading apparatus 44 may be connected to a color imaging apparatus 33 as the external device 35 described above to constitute a color digital copying machine.

This application claims the benefit of Japanese Patent Application No. 2012-284438, filed Dec. 27, 2012, which is hereby incorporated by reference herein in its entirety.

What is claimed is:

1. A lens array comprising:
a plurality of imaging portions arrayed in a first direction;
wherein each of the plurality of imaging portions includes a first optical system configured to form an intermediate image of an object and a second optical system configured to re-form the intermediate image of the object in a first cross section parallel to the first direction and a direction of optical axes of the imaging portions, and
wherein in each of the plurality of imaging portions, an optical flux from an object height at which a light available efficiency becomes 90% is restricted by at least one of a first aperture surface of the first optical system and a second aperture surface of the second optical system, and the optical flux from an object height at which the light available efficiency becomes 10% is restricted by the aperture surface which restricts the optical flux from the object height at which the light available efficiency becomes 90%.

2. The lens array according to claim 1, wherein in each of the plurality of imaging portions, the optical flux from an outermost object height is restricted by the aperture surface which restricts the optical flux from the object height at which the light available efficiency becomes 90%.

3. The lens array according to claim 1, wherein in each of the plurality of imaging portions, the optical flux from an axial object height is restricted by at least one of the first and second aperture surfaces, and the optical flux from the outermost object height is restricted by the aperture surface which restricts the optical flux from the axial object height.

4. The lens array according to claim 2, wherein a condition, $$(n-0.1) \times p \leq L \leq (n+0.1) \times p$$

is satisfied, where p is an array pitch of the plurality of imaging portions in the first direction, L is the outermost object height, and n is a positive integer.

5. The lens array according to claim 1, wherein a shape of at least one of the first and second aperture surfaces is a rectangular shape.

6. The lens array according to claim 1, wherein each of the imaging portions forms an inverted image of the object in a second cross section perpendicular to the first direction.

7. The lens array according to claim 1, wherein the first aperture surface is a farthest optical surface from an object surface of the first optical system.

8. The lens array according to claim 1, wherein at least one of the first and second aperture surfaces has an effective diameter in the second direction perpendicular to the first direction and the direction of optical axes of the imaging portions larger than an effective diameter in the first direction.

9. The lens array according to claim 1, wherein the effective diameter of the first aperture surface in the first direction and the effective diameter of the second aperture surface in the first direction are equal to each other.

10. The lens array according to claim 1, wherein each of the plurality of imaging portions has an anamorphic aspherical lens surface.

11. The lens array according to claim 1, wherein the plurality of imaging portions are arrayed in the first direction and the second direction perpendicular to the first direction and the direction of the optical axes of the imaging portions, and
the plurality of imaging portions are arrayed in a plane parallel to the first direction and the second direction in a zigzag pattern.

12. The lens array according to claim 1, wherein the first optical system and the second optical system have an optically symmetrical structure with respect to an intermediate imaging surface of the imaging portion.

13. The lens array according to claim 1, wherein an image of one object point is formed by at least two of the imaging portions.

14. The lens array according to claim 1, wherein the first aperture surface is a lens surface of the first optical system, and the second aperture surface is a lens surface of the second optical system.

15. The lens array according to claim 1, wherein the first optical system includes a first aperture stop and the second optical system includes a second aperture stop, and
the first aperture surface is formed of the first aperture stop, and the second aperture surface is formed of the second aperture stop.

16. An imaging apparatus comprising:
a lens array including:
a plurality of imaging portions arrayed in a first direction;
wherein each of the plurality of imaging portions includes a first optical system configured to form an intermediate image of an object and a second optical system configured to re-form the intermediate image of the object in a first cross section parallel to the first direction and a direction of optical axes of the imaging portions,
wherein in each of the plurality of imaging portions, an optical flux from an object height at which the light available efficiency becomes 90% is restricted by at least one of a first aperture surface of the first optical system and a second aperture surface of the second optical system, and the optical flux from an object height at which the light available efficiency becomes 10% is restricted by the aperture surface which restricts the optical flux from the object height at which the light available efficiency becomes 90%;
a light source including a plurality of light-emitting points arranged on an object surface of the lens array;
a developing unit configured to develop electrostatic latent image formed by the lens array on a photosensitive surface of a photosensitive member arranged on an image plane of the lens array by using a plurality of light fluxes emitted from the light source as a toner image;
a transfer device configured to transfer the developed toner image to a recording material; and
a fixing device configured to fix the transferred toner image onto the recording material,
wherein the lens array is arranged so that a second direction perpendicular to the first direction and the direction of the optical axis of the imaging portions matches a direction of rotation of the photosensitive member.

17. An image reading apparatus comprising:
a lens array including:
a plurality of imaging portions arrayed in a first direction;
wherein each of the plurality of imaging portions includes a first optical system configured to form an intermediate image of an object and a second optical system configured to re-form the intermediate image of the object in a first cross section parallel to the first direction and a direction of optical axes of the imaging portions,
wherein in each of the plurality of imaging portions, an optical flux from an object height at which the light available efficiency becomes 90% is restricted by at least one of a first aperture surface of the first optical system and a second aperture surface of the second optical system, and the optical flux from an object height at which the light available efficiency becomes 10% is restricted by the aperture surface which restricts the optical flux from the object height at which the light available efficiency becomes 90%;

an illuminating device configured to illuminate an original;

a light-receiving portion arranged on an image surface of the lens array and configured to receive a light flux from the original condensed by the lens array; and a drive unit configured to change a relative position between the lens array and the original in a second direction perpendicular to the first direction and the direction of the optical axes of the imaging portions.

* * * * *